(12) United States Patent
Kashiwagi et al.

(10) Patent No.: US 8,620,880 B2
(45) Date of Patent: Dec. 31, 2013

(54) DATABASE SYSTEM, METHOD OF MANAGING DATABASE, AND COMPUTER-READABLE STORAGE MEDIUM

(75) Inventors: Takehiko Kashiwagi, Tokyo (JP); Junpei Kamimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/995,164

(22) PCT Filed: May 28, 2009

(86) PCT No.: PCT/JP2009/002359
§ 371 (c)(1),
(2), (4) Date: Nov. 29, 2010

(87) PCT Pub. No.: WO2009/144941
PCT Pub. Date: Dec. 3, 2009

(65) Prior Publication Data
US 2011/0082843 A1 Apr. 7, 2011

(30) Foreign Application Priority Data

May 30, 2008 (JP) ................................ 2008-143767
Sep. 26, 2008 (JP) ................................ 2008-249042

(51) Int. Cl.
*G06F 17/30* (2006.01)
(52) U.S. Cl.
USPC ....................................................... 707/693
(58) Field of Classification Search
None
See application file for complete search history.

(56) References Cited

U.S. PATENT DOCUMENTS 5,727,197 A * 3/1998 Burgess et al. ........................ 1/1
6,367,063 B1 * 4/2002 Harding et al. ................. 326/38
7,716,180 B2 * 5/2010 Vermeulen et al. ........... 707/626

FOREIGN PATENT DOCUMENTS

| JP | 9-212528 A | 8/1997 |
| JP | 2000339390 A | 12/2000 |
| JP | 2005208757 A | 8/2005 |
| WO | 0010103 A | 2/2000 |

OTHER PUBLICATIONS

Riccardi, Greg, Principles of Database Systems with Internet and Java Applications, Addison Wesley, 2001, pp. 258, 278-279, and 306-307.*
International Search Report for PCT/JP2009/002359 mailed Jun. 23, 2009.

(Continued)

*Primary Examiner* — Neveen Abel Jalil
*Assistant Examiner* — Tyler Torgrimson

(57) ABSTRACT

The database system includes: a storage unit that stores a database including an entity data group and a plurality of identifier tables having only a plurality of fixed-length data; and a data processing unit that receives a query and performs data processing on the database on the basis of the received query. Each of the identifier tables includes at least one tuple that is defined in a row direction and at least one attribute field that is defined in a column direction and includes a plurality of data identifiers uniquely indicating the plurality of entity data as the fixed-length data. The database includes a link table that connects the tuples between the identifier tables, in addition to the plurality of identifier tables. The data processing unit performs the data processing using the link table and the identifier tables.

21 Claims, 17 Drawing Sheets

(56) References Cited

OTHER PUBLICATIONS

Hideaki Takahashi, "Post RDB", Nikkei Byte No. 251, Japan, Nikkei Business Publications, Inc., Mar. 22, 2004, pp. 38-43. Concise English language explanation is provided in English language translation of Japanese Office Action (No. 2 of Non-Patent Literature Documents).

Japanese Office Action for JP 2010-514373 mailed on Jun. 4, 2013 with English Translation.

\* cited by examiner

FIG. 17

| DATA FORMAT | DATA TYPE | STORAGE AREA |
|---|---|---|
| 1 | 1 | PAa |
| 2 | 1 | PAb |
| 1 | 2 | PAc |
| 2 | 2 | PAd |

DATABASE SYSTEM, METHOD OF MANAGING DATABASE, AND COMPUTER-READABLE STORAGE MEDIUM

The present application is the National Phase of PCT/JP2009/002359, filed May 28, 2009, which claims priority based on Japanese Patent Application No. 2008-143767, filed May 30, 2008 and Japanese Patent Application No. 2008-249042, filed Sep. 26, 2008, the content of which is incorporated herein by reference.

TECHNICAL FIELD

The present invention relates to a database structure and a technique for processing data in a database.

BACKGROUND ART

A relational database management system (RDBMS) is based on a relational model theory proposed by Edgar Frank Codd (E. F. Codd) in 1970 and has been widely used. A relational database (RDB) is an aggregate of a plurality of tables (that is, relations), and each table includes at least one row (tuple) and at least one column (attribute field). For example, there is Patent Document 1 (Japanese Laid-Open Patent Publication No. 2005-208757) as a related art document about RDBMS.

However, in a general RDBMS, when a data processing amount increases and a processing load increases, a reduction in the processing speed of transactions is noticeable. One of the causes of the reduction in the processing speed is that, when a search is performed for the table forming the RDB for each row having a variable data length, it takes a long time to calculate a data reading position, as compared to when the data length of each row is fixed.

In addition, RDBMS manages data for each row using a unique key. Therefore, it is possible to effectively perform a large number of processes for each row at the high speed, but it is difficult to effectively perform a large number of processes for each column. For example, when processing data for each column, RDBMS needs to read a plurality of rows of data corresponding to a column required by a query, which causes a reduction in the processing speed. RDBMS can write each row of data to continuous storage areas of a memory. Therefore, it is possible to access each row of data at a high speed. However, when RDBMS performs a transaction related to, for example, a search process for each column, a comparison operation, or an aggregate calculation, access to data stored in a plurality of discontinuous memory areas is likely to occur frequently, which results in a reduction in the processing speed.

A system called a data warehouse (DWH) has been used as a database system that effectively performs a search process or an aggregate process on a large amount of data. However, DWH is a system that is constructed independently from basic business systems and does not update data (add new data, change the existing data, or remove the existing data) in principle. Therefore, DWH does not have a database structure capable of effectively updating data.

In order to solve the problems of RDBMS or DWH according to the related art, for example, Patent Document 2 (Japanese Laid-Open Patent Publication No. 2000-339390) and Patent Document 3 (Pamphlet of International Publication No. WO 00/10103) disclose database systems. The database systems disclosed in Patent Document 2 and Patent Document 3 use a database structure obtained by converting logical tabular data into a plurality of information blocks corresponding to items, for example, sex, age, height, and weight. Each of the information blocks includes a value management table (value list) and an array of pointers to the value management table. The array of the pointers to the value management table means an array in which item value numbers (that is, the pointers to the value management table) in a certain column of tabular data are stored in a predetermined order (the order of record numbers) of the tabular data.

However, in the database structure disclosed in Patent Document 2 and Patent Document 3, the item value numbers in the value management table need to be arranged in a predetermined order. Therefore, when a new item value number is inserted into the value management table during the update of data (for example, the update, insertion, or removal of records), it is necessary to rearrange other existing item value numbers. In addition, the array of the pointers to the value management table needs to be updated such that the pointers are matched with the rearranged item value numbers. Therefore, in the database structure disclosed in Patent Document 2 and Patent Document 3, it is impossible to effectively update data at a high speed. In particular, when data is frequently updated, a processing load is very large and the processing speed is significantly reduced.

[Patent Document 1] Japanese Laid-Open Patent Publication No. 2005-208757
[Patent Document 2] Japanese Laid-Open Patent Publication No. 2000-339390
[Patent Document 3] Pamphlet of International Publication No. WO 00/10103

DISCLOSURE OF THE INVENTION

The invention has been made in view of the above-mentioned problems and an object of the invention is to provide a database system, a method of managing a database, a database structure, and a computer program capable of effectively updating data in a database at a high speed.

According to the present invention, there is provided a database system including: a storage unit that stores a database including an entity data group containing a plurality of entity data and a plurality of identifier tables having only a plurality of fixed-length data; and a data processing unit that receives a query and performs data processing on the database on the basis of the received query. In the database system, each of the identifier tables includes at least one tuple that is defined in a row direction and at least one attribute field that is defined in a column direction and includes a plurality of data identifiers uniquely indicating the plurality of entity data as the fixed-length data. The database includes a link table that connects the tuples between the identifier tables, in addition to the plurality of identifier tables. The data processing unit performs the data processing using the link table and the identifier tables.

According to the present invention, there is provided a method of managing a database including: a step of receiving a query for a database including an entity data group containing a plurality of entity data and a plurality of identifier tables having only a plurality of fixed-length data; and a step of performing data processing on the database on the basis of the received query. Each of the identifier tables includes at least one tuple that is defined in a row direction and at least one attribute field that is defined in a column direction and includes a plurality of data identifiers uniquely indicating the plurality of entity data as the fixed-length data. The database includes a link table that connects the tuples between the identifier tables, in addition to the plurality of identifier tables. The data processing is performed using the link table and the identifier tables.

According to the present invention, there is provided a database structure including: an entity data group that includes a plurality of entity data; a plurality of identifier tables that has only a plurality of fixed-length data; and a link table that associates the identifier tables. In the data structure, each of the identifier tables includes at least one tuple that is defined in a row direction and at least one attribute field that is defined in a column direction and includes a plurality of data identifiers uniquely indicating the plurality of entity data as the fixed-length data. The link table connects the tuples between the identifier tables.

According to the present invention, there is provided a computer program that causes a computer to execute a database management process. The database management process includes: a process of receiving a query for a database including an entity data group containing a plurality of entity data and a plurality of identifier tables having only a plurality of fixed-length data; and a process of performing data processing on the database on the basis of the received query. Each of the identifier tables includes at least one tuple that is defined in a row direction and at least one attribute field that is defined in a column direction and includes a plurality of data identifiers uniquely indicating the plurality of entity data as the fixed-length data. The database includes a link table that connects the tuples between the identifier tables, in addition to the plurality of identifier tables. The data processing is performed using the link table and the identifier tables.

As described above, the database system according to the invention includes the database including an entity data group and an identifier table having the fixed-length data identifiers that uniquely indicate a plurality of entity data in the entity data group. Therefore, for example, when specific entity data in the entity data group is updated in response to a query, it is possible to update the database only by updating a data identifier corresponding to the updated entity data.

When entity data is added (inserted) to the entity data group in response to a query, it is possible to update the database only by adding a data identifier corresponding to the added entity data to the identifier table.

When entity data is removed from the entity data group in response to a query, it is possible to update the database only by removing a data identifier corresponding to the removed entity data from the identifier table. As such, when the entity data is updated, added, or removed, the identifier table is updated in the minimum range. Therefore, it is possible to effectively update the database at a high speed.

The method of managing a database and the computer program according to the invention can effectively update the database at a high speed since they perform the update process on the database.

The database structure according to the invention can be applied to the database incorporated into the database system. In addition, the database structure can be applied to the database used in the database management method or the computer.

It is possible to effectively update a database at a high speed.

BRIEF DESCRIPTION OF THE DRAWINGS

The above-mentioned objects, objects other than them, characteristics, and advantages will become more apparent by the accompanying drawings and the following preferred exemplary embodiments.

FIG. 17 is a diagram illustrating the correspondence between combinations of a data type and a data format and partition areas.

BEST MODE FOR CARRYING OUT THE INVENTION

Figure 1:
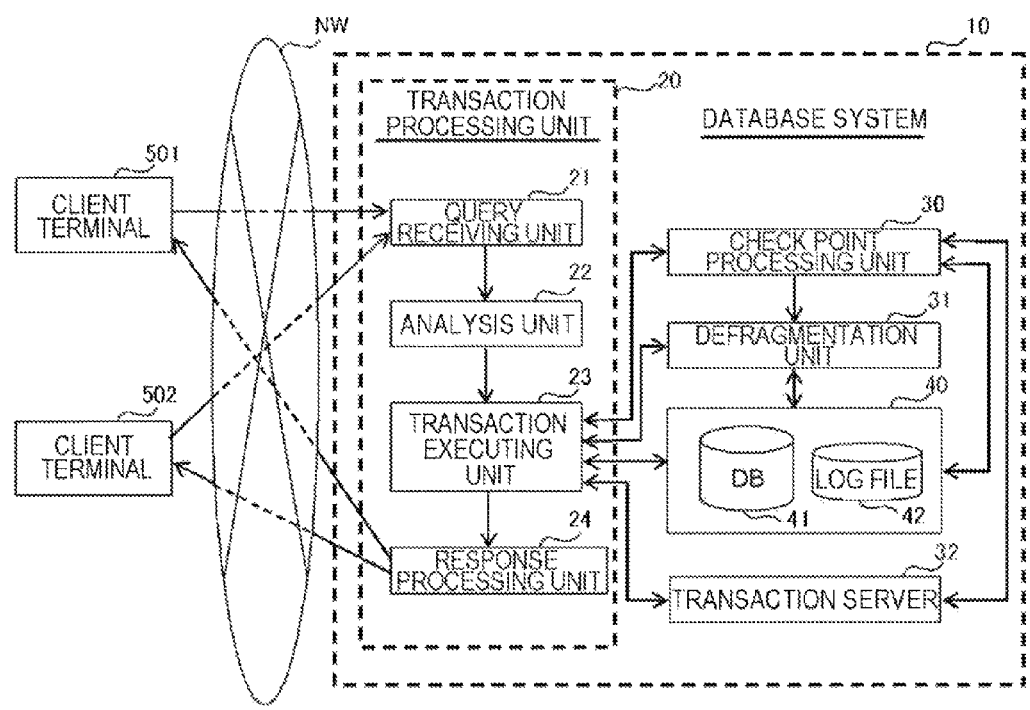
FIG. 1 is a functional block diagram illustrating the schematic structure of a database system according to an exemplary embodiment of the invention.

Hereinafter, various exemplary embodiments of the invention will be described with reference to the accompanying drawings. In all of the drawings, components having the same structure or function are denoted by the same reference numerals and a detailed description thereof will not be arbitrarily omitted with no overlapping description.

(Basic Structure of Database System 10)

FIG. 1 is a functional block diagram illustrating the schematic structure of a database system 10 according to an exemplary embodiment of the invention. The database system 10 includes a transaction processing unit 20, a check point processing unit 30, a defragmentation unit 31, a transaction server 32, and a storage device 40. A database 41 and a log file 42 are stored in the storage device 40. The transaction processing unit 20 includes a query receiving unit 21, an analysis unit 22, a transaction executing unit 23, and a response processing unit 24.

The database system 10 and a plurality of client terminals 501 and 502 are connected to a network NW. A general small network (for example, a wired or wireless LAN) is given as an example of the network NW, but the network is not particularly limited. The network NW may be a large network, such as the Internet.

Each of the client terminals 501 and 502 has a function of transmitting a query described with a query language (database language), such as a structured query language (SQL) or an XML query language (XQuery), for the database 41 to the database system 10.

The hardware structure of the database system 10 may be a general-purpose structure, and includes, for example, a processor, such as a central processing unit (CPU), and hardware resources, such as a main memory, a cache memory, a bus for transmitting signals, a timer circuit, an input device (for example, a keyboard), and an output device (for example, a display or a printer). However, the hardware structure of the database system 10 is not particularly limited.

All or some of the structures of the database system 10 may be implemented by hardware or a computer program (or a program code) that causes a processor to perform processes. When the functions of the components 21 to 24, 30, 31, and 32 of the database system 10 are implemented by the computer program, the processor reads the computer program from a storage medium, such as a non-volatile memory, and executes the read computer program. The components 21 to 24, 30, 31, 32, and 40 of the database system 10 may be incorporated into one apparatus, or they may be dispersed and incorporated into a plurality of apparatuses that is operated in cooperation with each other.

Figure 2:
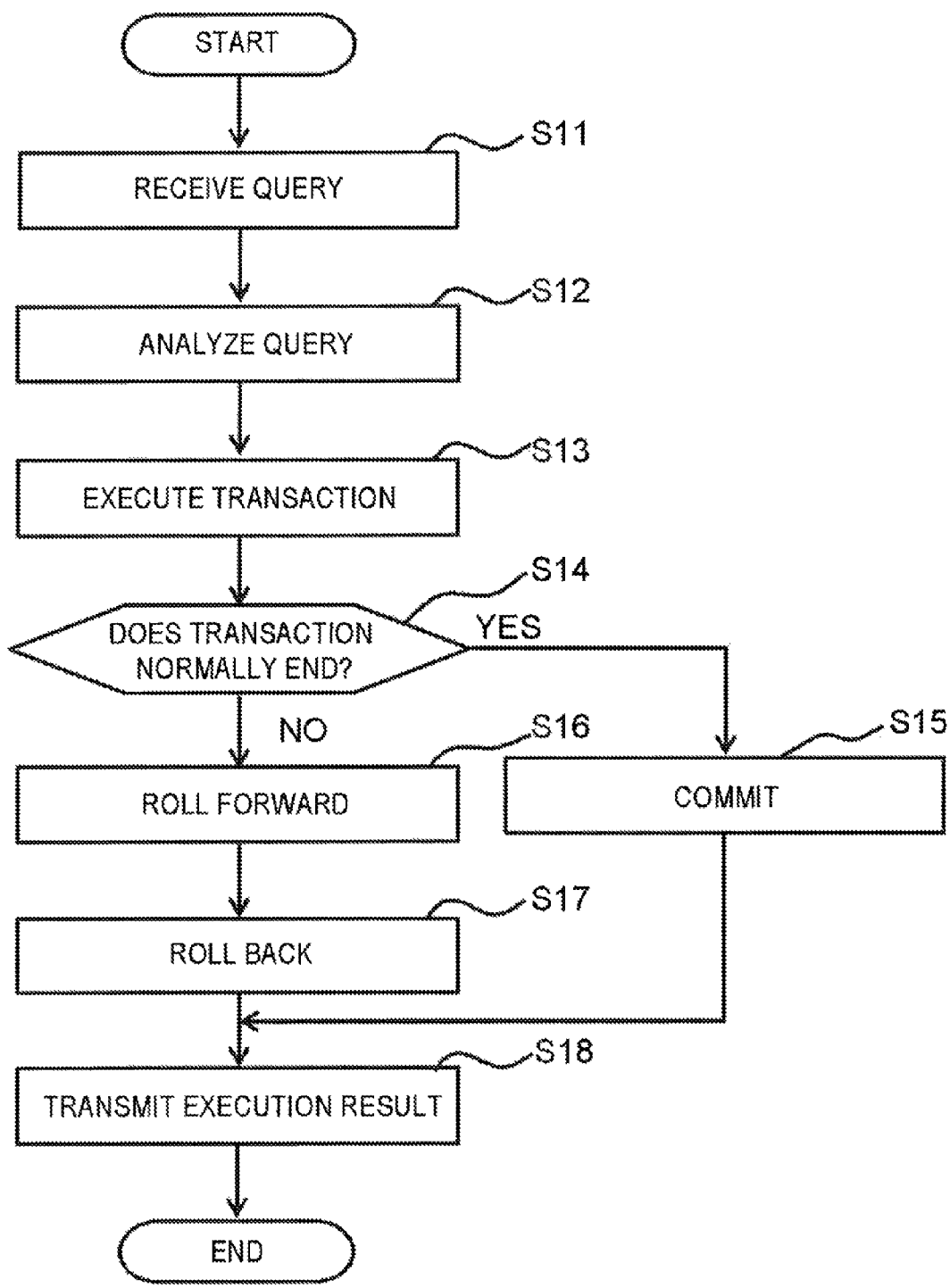
FIG. 2 is a flowchart schematically illustrating the procedure of the process of a transaction processing unit of a database system.

FIG. 2 is a flowchart schematically illustrating the procedure of the process of the transaction processing unit 20 of the database system 10. In the transaction processing unit 20, the query receiving unit 21 receives queries transmitted from the client terminals 501 and 502 (Step S11) and transmits the received queries to the analysis unit 22. The analysis unit 22 analyzes the queries (for example, a parsing or optimizing process) and transmits the analysis result to the transaction executing unit 23 (Step S12). The transaction executing unit 23 performs a transaction on the database 41 on the basis of the analysis result (Step S13). The term "transaction" means one work unit including, for example, a process of searching or updating the database 41, and is a process satisfying ACID characteristics, such as atomicity, consistency, isolation, and durability. When the transaction process is normally completed (Step S14; YES), the transaction is committed (Step S15).

The transaction executing unit 23 stores the log information (history information) of the transaction as the log file 42 in the storage device 40. At the same time, the transaction executing unit 23 stores metadata of the log of the transaction (information about the start or end of the transaction) in the transaction server 32.

The check point processing unit 30 has a function of periodically setting a check point on the basis of the log file 42 and the metadata stored in the transaction server 32. When the transaction does not end normally due to a failure in the transaction or the system (Step S14 of FIG. 2; NO), the transaction executing unit 23 performs roll-forward (Step S16). That is, the check point processing unit 30 checks the log information during a period Terr from the previously set checkpoint to the time when a failure occurs with reference to the log file 42 and removes the log information related to the transaction that has not been committed during the period Terr from the log file 42. When there is a transaction that is committed during the period Terr, the transaction executing unit 23 reflects the execution result of the transaction to the database 41 on the basis of the log file 42. Then, the transaction executing unit 23 returns the database 41 to the state before the transaction that is not committed starts to be processed, that is, the transaction executing unit 23 performs roll-back (Step S17).

The response processing unit 24 receives the execution result of the transaction from the transaction executing unit 23 and transmits the execution result to the client terminals 501 and 502 (Step S18).

The database 41 has a structure including an entity data group including a plurality of entity data and at least one identifier table including only a plurality of fixed-length data, which will be described below. The identifier table includes a plurality of data identifiers that substantially uniquely indicates the plurality of entity data as the fixed-length data. In addition, the identifier table includes at least one tuple that is defined in the row direction and at least one attribute field that is defined in the column direction and includes data identifiers, which will be described below.

When selecting specific entity data from the entity data group in response to a query request, the transaction executing unit 23 can search for a fixed-length data identifier in the identifier table without searching for the entity data group and select the entity data on the basis of the search result. The transaction executing unit 23 can perform a transaction including a process of searching or updating the database 41 on the basis of the select result.

When the database 41 is repeatedly updated, data is repeatedly stored in or removed from the storage device 40. Therefore, the data group stored in continuous storage areas of the storage device 40 is fragmented (fragmentation), and the cache hit ratio is reduced, which results in a low processing speed. When a plurality of data identifiers is dispersed and stored in a plurality of discontinuous storage areas of the storage device 40, the defragmentation unit 31 has a function of reading these data identifiers from the storage device 40 and writing the data identifiers to the continuous storage areas allocated to the identifier table.

Next, the structure of the database 41 according to various exemplary embodiments of the invention will be described.

First Exemplary Embodiment

Figure 3:
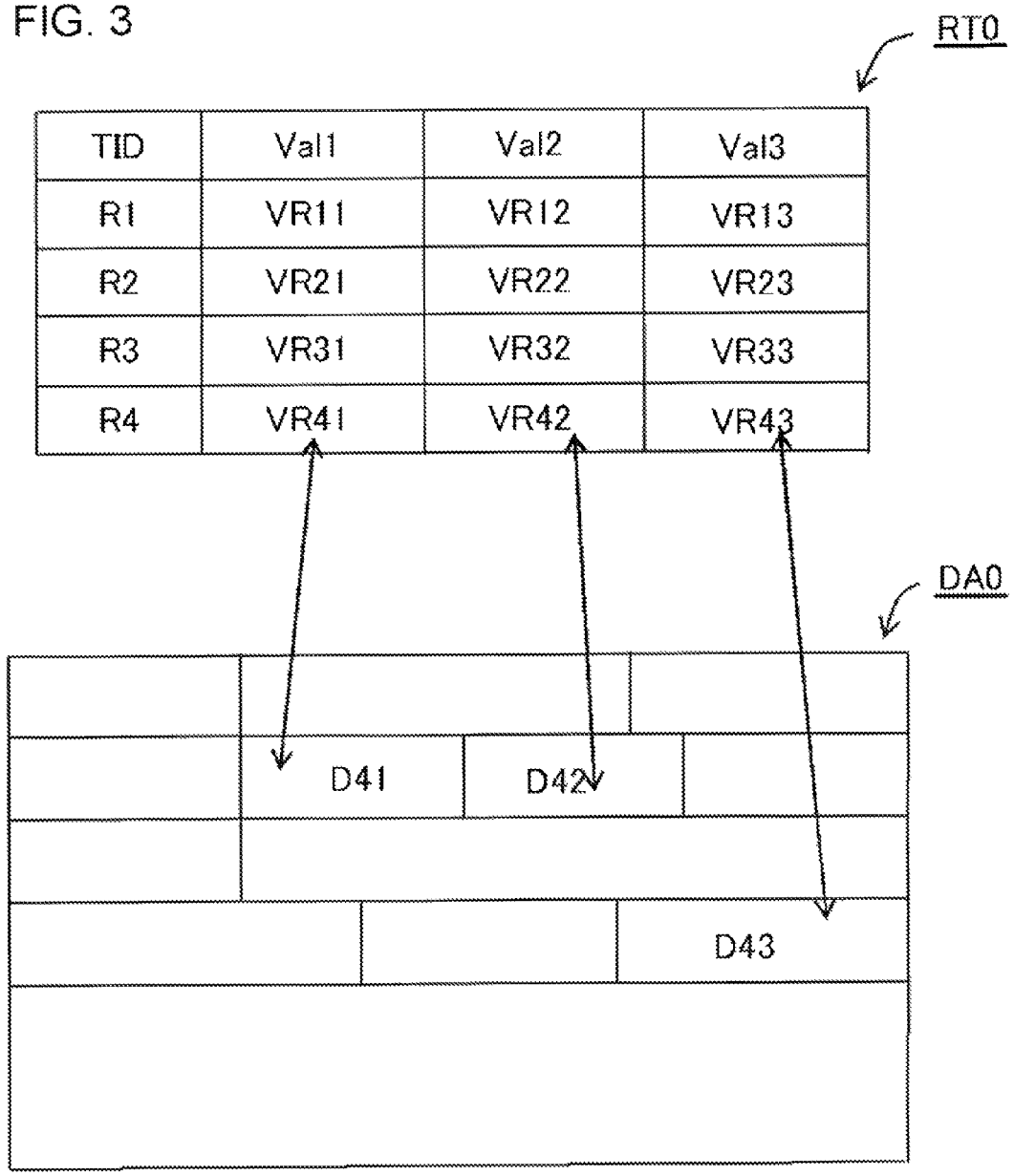
FIG. 3 is a diagram schematically illustrating an example of a database structure according to a first exemplary embodiment of the invention.

FIG. 3 is a diagram schematically illustrating an example of a database structure according to a first exemplary embodiment of the invention. As shown in FIG. 3, the database structure includes an entity data group stored in a storage area DA0 of the storage device 40 and an identifier table RT0 that is stored in a storage area different from the storage area DA0.

The identifier table RT0 includes four tuples that are defined in the row direction and four attribute fields TID, Val1, Val2, and Val3 that are defined in the column direction. In the first exemplary embodiment, for convenience of description, the number of tuples in the identifier table RT0 is four, but the number of tuples is not limited thereto. For example, several tens to millions of tuples may be set. The number of attribute fields TID, Val1, Val2, and Val3 is not limited to four. For example, a "client name", a "company name", and a "sex" may be set as the names (attribute names) of the attribute fields Val1, Val2, and Val3.

Unique tuple identifiers R1, R2, R3, and R4 are allocated to the four tuples of the identifier table RT0. The attribute field Val1 includes fixed-length data identifiers VR11, VR21, VR31, and VR41 in areas corresponding to four tuples. The attribute field Val2 includes fixed-length data identifiers VR12, VR22, VR32, and VR42 in areas corresponding to four tuples. The attribute field Val3 includes fixed-length data identifiers VR13, VR23, VR33, and VR43 in areas corresponding to four tuples.

The data identifiers VR11 to VR43 have values that substantially uniquely indicate the entity data in the storage area DA0. Therefore, the transaction executing unit 23 can search for the data identifiers VR11 to VR43 and access variable-length entity data corresponding to any one of the data identifiers VR11 to VR43 on the basis of the search result. In the specification, the term "substantially uniquely" means satisfying uniqueness in the processing of data in the database 41.

For example, when a "client name", a "company name", and a "sex" are set as the names (attribute names) of the attribute fields Val1, Val2, and Val3, the data identifiers VR11, VR12, and VR13 may uniquely indicate entity data D11, D12, and D13 of "Yamada Taro", "N company", and "male", respectively, the data identifiers VR21, VR22, and VR23 may uniquely indicate entity data D21, D22, and D23 of "Sato Hanako", "F company", and "female", respectively, and the data identifiers VR31, VR32, and VR33 may uniquely indicate entity data D31, D32, and D33 of "Ito Hajime", "S company", and "unknown", respectively.

The values of the data identifiers VR11 to VR43 can be calculated by a one-way hash function. The hash function outputs a fixed-length bit string when entity data is input. Therefore, the output value (hash value) of the hash function may be used as the values of the data identifiers VR11 to VR43. The transaction executing unit 23 can convert a search character string into a hash value, retrieve a data identifier having a value equal to the hash value from the identifier table RT0, and select entity data corresponding to the retrieved data identifier. In this case, the transaction executing unit 23 searches the identifier table RT0 including only the fixed-length data group. Therefore, the transaction executing unit 23 can find out a character string at a high speed. In particular, it is possible to perform a search process for each row at a high speed.

Figure 4:
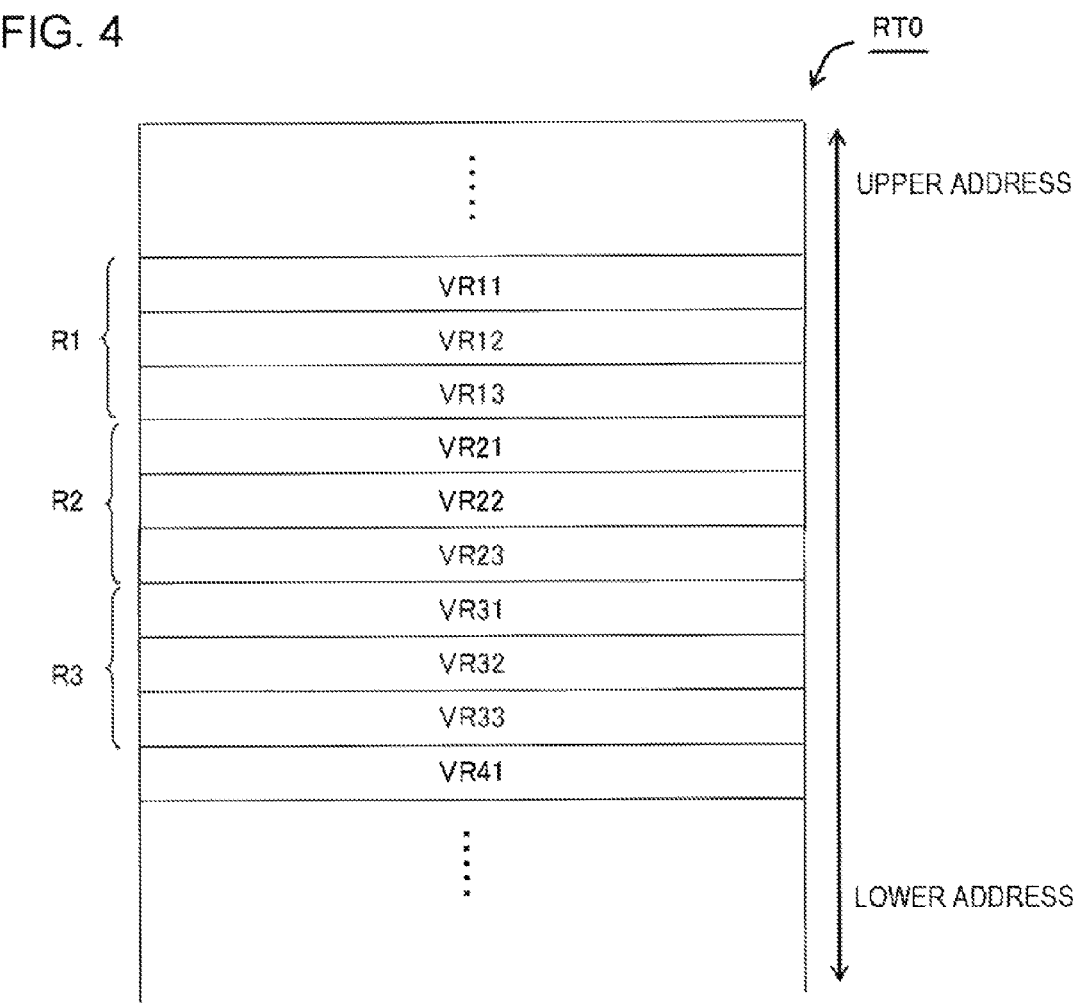
FIG. 4 is a diagram illustrating the storage of data identifiers in continuous storage areas.

As shown in FIG. 4, it is preferable that the data identifiers VR11 to VR41 be stored in continuous storage areas. In this way, access to the data identifiers VR11 to VR43 is performed at a high speed, and the cache hit ratio is improved. As a result, the search speed is improved.

However, when the database 41 is frequently updated, the data identifiers VR11 to VR43 are likely to be dispersed and stored in discontinuous storage areas. For example, a group of the data identifiers VR11 to VR13 and a group of the data identifiers VR21 to VR23 are stored in the storage areas that are separated from each other. In this case, the defragmentation unit 31 reads the data identifiers VR11 to VR43 from the storage area at a predetermined timing and writes the read data identifiers VR11 to VR43 to continuous areas. In this way, it is possible to prevent a reduction in the search speed.

Figure 5:
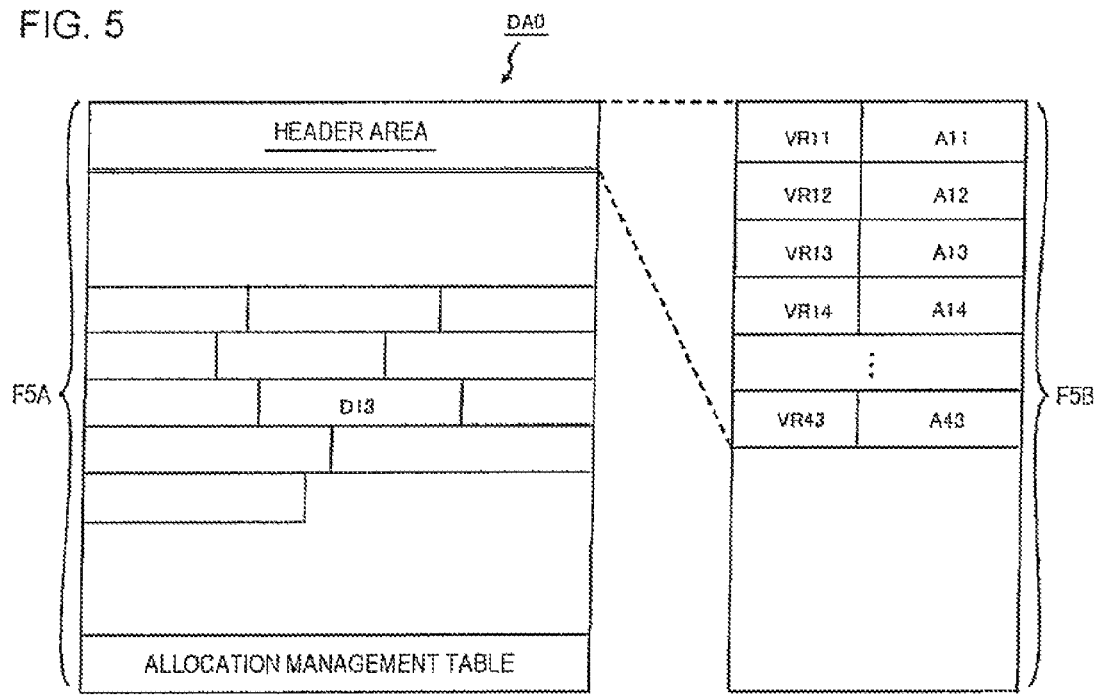
FIG. 5 is a diagram schematically illustrating an example of a data structure stored in a storage area.

FIG. 5 is a diagram schematically illustrating an example of the data structure stored in the storage area DA0. The data structure has a header area at the head and an allocation management table at the end. An area in which an entity data group is stored is provided between the header area and the allocation management table.

The header area includes a conversion table indicating the correspondence between position data indicating the storage areas of the entity data and data identifiers. Specifically, as shown by symbol F5B in FIG. 5, the conversion table defines the correspondence between a plurality of data identifiers VR11 to VR43 and position data A11 to A43 indicating the storage areas of a plurality of entity data D11 to D43. The position data A11 to A43 may be addresses designating the absolute positions of the storage areas of the corresponding entity data D11 to D43 or offsets designating the relative positions of the storage areas. The transaction executing unit 23 can search the identifier table RT0 and refer to the header area shown by symbol F5A in FIG. 5 to access the entity data D11 to D43. As such, the entity data group and the identifier table RT0 are logically connected to each other through the header area. In this way, it is possible to effectively update the database 41 at a high speed, which will be described below.

In the conversion table, the overlap between the data identifiers having the same values is excluded (that is, two arbitrary data identifiers certainly have different values in the conversion table). Therefore, the use of the conversion table makes it possible to store the entity data having the same value in the storage area DA0 without any overlap therebetween. That is, it is possible to compress the entity data group forming the database 41 and store it in the storage area DA0. Therefore, it is possible to effectively use the storage area DA0.

Figure 6:
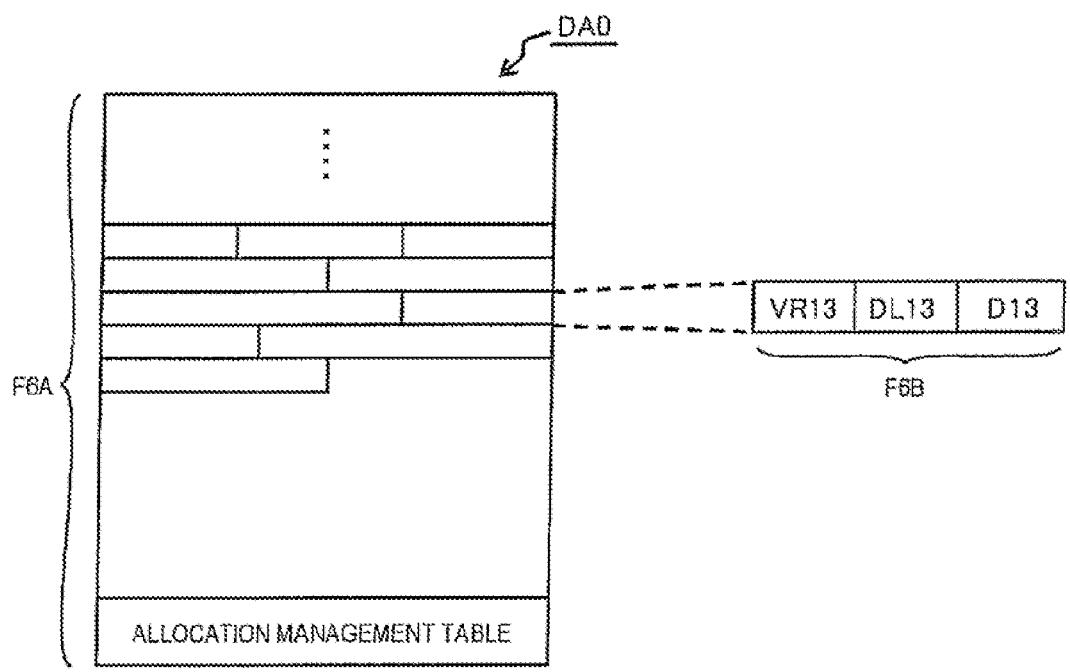
FIG. 6 is a diagram schematically illustrating another example of the data structure stored in the storage area.

FIG. 6 is a diagram schematically illustrating another example of the data structure stored in the storage area DA0. There is no header area including the conversion table in the data structure. As shown by symbol F6B in FIG. 6, a data identifier VR13 for searching having the same value as the corresponding data identifier VR13 and a value DL13 indicating the bit length of the entity data D13 are added to the entity data D13, in a manner similar to that for the other entity data. The transaction executing unit 23 can search the identifier table RT0 and also search for data identifiers VR11 to VR43 for searching shown by symbol F6A in FIG. 6 to access the entity data D11 to D43.

When the database structure according to the first exemplary embodiment is used, the database system 10 has the following effects.

First, it is possible to effectively update the database 41 at a high speed. That is, the database 41 according to the first exemplary embodiment includes a plurality of entity data D11 to D43 and a plurality of data identifiers VR11 to VR43 that substantially uniquely indicates the entity data D11 to D43. For example, during the replacement of specific entity data D41 in the database 41 with new entity data in response to a query, when there is entity data having the same value as the new entity data in the storage area D0, it is possible to update the database 41 only by replacing the data identifier VR41 in the identifier table RT0 with a new data identifier without actually rewriting the entity data D41 in the storage area D0.

During the addition (insertion) of a record to the entity data group in response to a query, when there is entity data having the same value as entity data to be included in the record in the storage area D0, it is possible to update the database 41 only by adding a data identifier corresponding to the record to the identifier table RT0. When the entity data D41 is removed from the entity data group in response to a query, it is possible to update the database 41 only by removing the data identifier VR41 from the identifier table RT0, without directly removing the entity data D41 from the storage area D0.

As such, it is possible to ensure a high real-time performance in the processing of the database in response to an update query, such as replacement, addition, or removal. Even when the database 41 is frequently updated, it is possible to effectively update the database at a high speed.

Second, it is possible to improve the portability of the database. That is, since the data identifiers VR11 to VR43 substantially uniquely indicate the entity data D11 to D43, the dependency of the data identifiers VR11 to VR43 on the hardware structure is low. Therefore, it is possible to easily port the database according to the first exemplary embodiment to other systems.

Third, it is possible to improve the dispersibility of the database 41. As described above, the storage area allocated to the identifier table RT0 is different from the storage area DAD allocated to the entity data group. That is, the identifier table RT0 is completely separated from the entity data group. Therefore, it is easy to arrange the identifier table RT0 and the entity data group so as to be dispersed. For example, it is possible to disperse the identifier table RT0 and the entity data group in two computer systems that are connected to through a computer network, such as a LAN.

Fourth, it is possible to prevent a reduction in the speed of access to the database 41. As described above, even when the data identifiers VR11 to VR43 are dispersed and stored in discontinuous storage areas (fragmentation), the defragmentation unit 31 can rewrite the data identifiers VR11 to VR43 to continuous storage areas. Therefore, it is possible to prevent a reduction in the speed of access to the database 41.

Second Exemplary Embodiment

Figure 7:
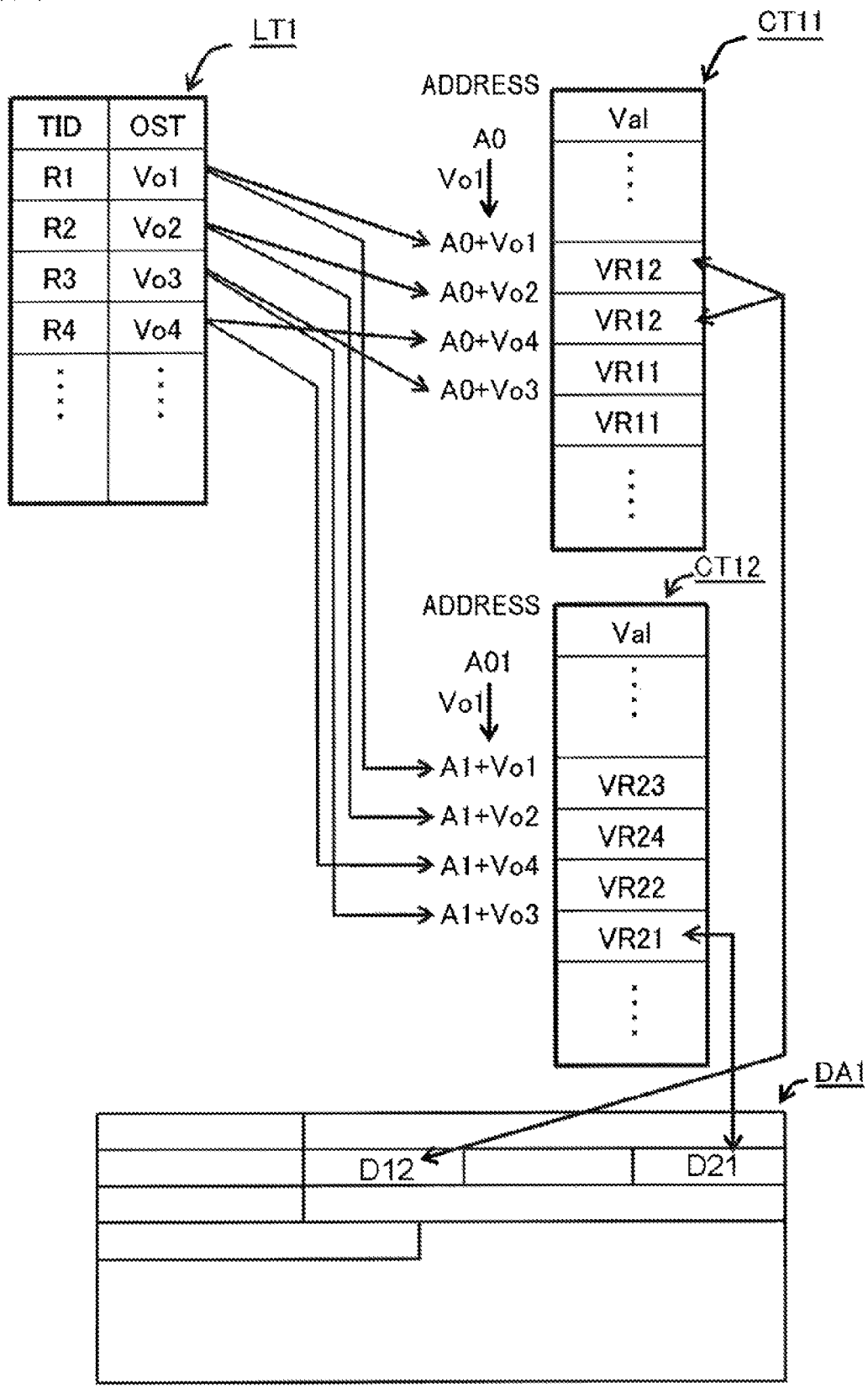
FIG. 7 is a diagram schematically illustrating an example of a database structure according to a second exemplary embodiment of the invention.

FIG. 7 is a diagram schematically illustrating an example of a database structure according to a second exemplary embodiment of the invention. As shown in FIG. 7, the database structure includes an entity data group that is stored in a storage area DA1 of a storage device 40, and a link table LT1 and first and second column tables (identifier tables) CT11 and CT12 that are stored in a storage area different from the storage area DA1. The reference table RT0 shown in FIG. 3 includes a plurality of attribute fields (columns) and each column includes data identifiers. In this exemplary embodiment, each of the column tables CT11 and CT12 has a data structure corresponding to each column of the reference table RT0 shown in FIG. 3. Each of the data structure of the column table CT11 and the data structure of the column table CT12 may be stored in a storage area in which the addresses are not continuous or a storage area in which the addresses are continuous.

The first column table CT11 includes a plurality of tuples defined in the row direction and one attribute field Val defined in the column direction. The attribute field Val includes fixed-length data identifiers VR12, VR12, VR11, and VR11 in areas corresponding to four tuples. The second column table CT12 includes a plurality of tuples defined in the row direction and an attribute field Val defined in the column direction. The attribute field Val includes fixed-length data identifiers VR23, VR24, VR22, and VR21 in areas corresponding to four tuples. For example, a "client name" may be set as the name (attribute name) of the attribute field Val of the column table CT11 and a "sex" may be set as the name of the attribute field Val of the column table CT12. In this case, the data identifiers VR12 and VR11 uniquely indicate entity data D12 and D11 of "Yamada Taro" and "Sato Hanako", and the data identifiers VR21 to VR24 uniquely indicate entity data D21 to D24 of "male" and "female".

The data identifiers VR11 to VR24 have values that substantially uniquely indicate the entity data D11 to D24 in the storage area DA1. Therefore, the transaction executing unit 23 can search for the data identifiers VR11 to VR24 and access variable-length entity data on the basis of the search result. The storage area DA1 may have the same conversion table as that shown in FIG. 5 or the same data identifier for searching as that shown in FIG. 6.

It is preferable that data identifiers be stored in continuous areas in each of the column tables CT11 and CT12. In this way, the speed of access to the data identifier increases and the cache hit ratio also increases. Therefore, the search speed is improved. Even when the database 41 is frequently updated, the defragmentation unit 31 reads one group of data identifiers from the storage area at a predetermined timing and writes the read data identifiers to continuous areas. In this way, it is possible to prevent a reduction in the search speed.

The link table LT1 has a structure that connects the tuples between the first column table CT11 and the second column table CT12. That is, the link table LT1 includes a plurality of tuples defined in the row direction and two attribute fields TID and OST defined in the column direction. The attribute field TID includes tuple identifiers R1, R2, R3, and R4 that uniquely indicate the tuples. The attribute field OST includes offsets Vo1, Vo2, Vo3, and Vo4 that designate the relative positions of the storage areas of the tuples in the column tables CT11 and CT12. For example, the offset Vo1 is added to a predetermined reference address A0, thereby obtaining an effective address Vo1+A0 designating the absolute position of the storage area of the data identifier VR12.

Similar to the first exemplary embodiment, the values of the data identifiers VR11 to VR24 included in each of the first and second column tables CT11 and CT12 may be calculated by a one-way hash function. The transaction executing unit 23 can convert a search character string into a hash value, retrieve a data identifier having a value equal to the hash value from the column tables CT11 and CT12, and select entity data corresponding to the retrieved data identifier. In this case, the transaction executing unit 23 searches the column tables CT11 and CT12 including only a fixed-length data group. Therefore, the transaction executing unit 23 can find out a character string at a high speed.

The database according to the second exemplary embodiment may be considered as a database in which two columns of tabular data are divided into the first column table CT11, the second column table CT12, and the entity data group. Therefore, it is possible to perform a search process for each column at a high speed.

In the second exemplary embodiment, the number of attribute fields Val in each of the column tables CT11 and CT12 is one, but the number of attribute fields Val is not limited to one. For example, the number of attribute fields in each of the column tables CT11 and CT12 may be set to two or more. In addition, the number of column tables CT11 and CT12 is not limited to two, but it may be three or more.

When the database structure according to the second exemplary embodiment is used, the database system 10 has the following effects.

First, it is possible to effectively update the database 41 at a high speed. That is, the database according to the second exemplary embodiment includes a plurality of entity data and a plurality of data identifiers VR11 to VR24 that substantially uniquely indicates the entity data. Therefore, similar to the first exemplary embodiment, it is possible to effectively perform the database process in response to an update query, such as update, addition, or removal, and thus ensure a high real time performance. Therefore, even when the database 41 is frequently updated, it is possible to effectively update the database at a high speed.

Second, it is possible to improve the dispersibility of the database. The column tables CT11 and CT12 are completely separated from the entity data group. Therefore, similar to the first exemplary embodiment, it is easy to arrange the column tables CT11 and CT12 and the entity data group so as to be dispersed.

Third, it is possible to flexibly determine the logical connection of the tuples between the column tables CT11 and CT12. For example, as shown in FIG. 7, it is possible to logically connect the tuple stored after an effective address A0+Vo3 of the column table CT11 and the tuple stored after an effective address A1+Vo3 of the column table CT12 using the offset Vo3 corresponding to the tuple identifier R3. At the same time, it is possible to logically connect the tuple stored after an effective address A0+Vo4 of the column table CT11 and the tuple stored after an effective address A1+Vo4 of the column table CT12 using the offset Vo4 corresponding to the tuple identifier R4.

Fourth, the column tables CT11 and CT12 are logically connected to each other by only one attribute field OST of the link table LT1. Therefore, it is possible to significantly reduce the amount of data in the link table LT1.

Third Exemplary Embodiment

Figure 8:
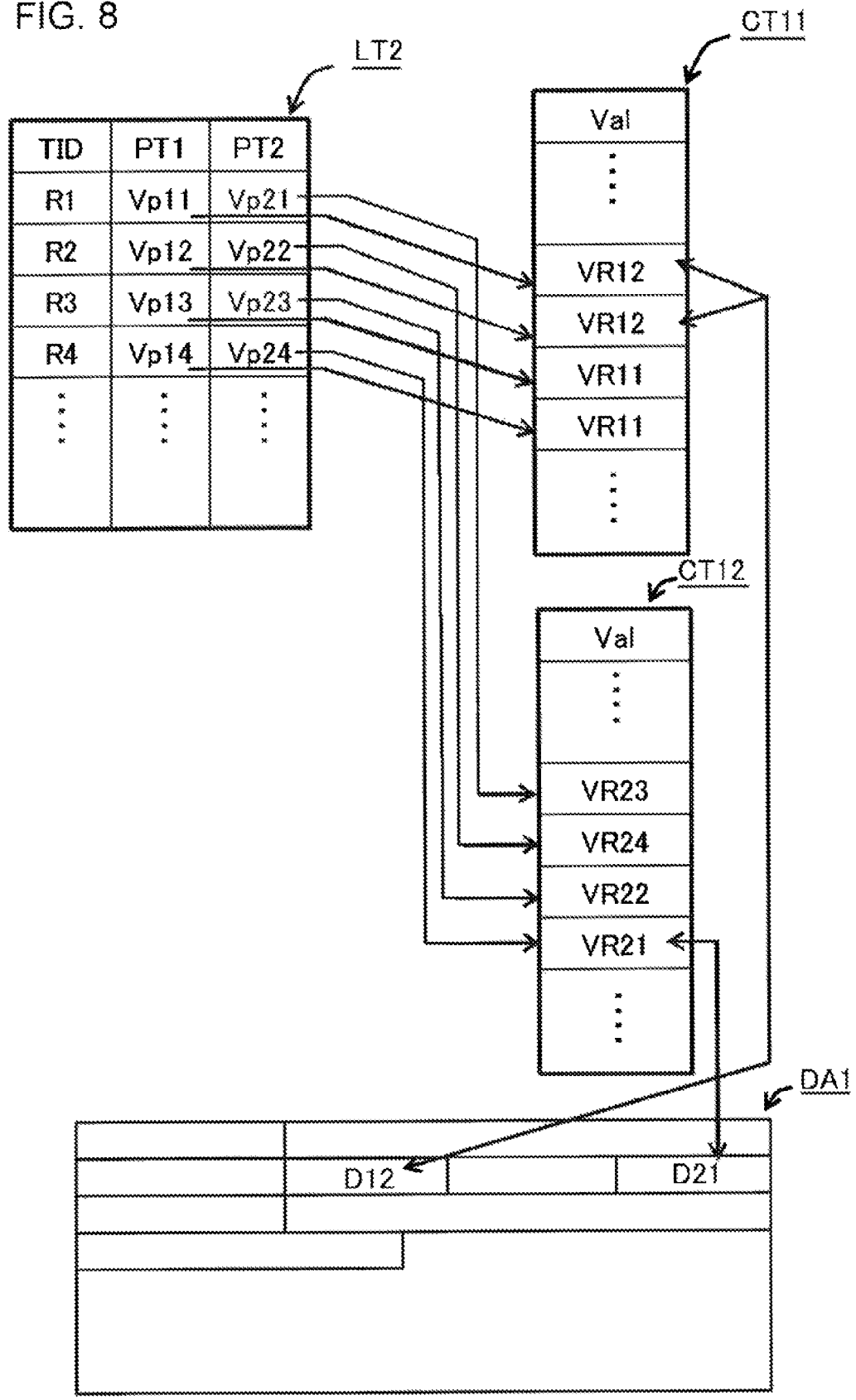
FIG. 8 is a diagram schematically illustrating an example of a database structure according to a third exemplary embodiment of the invention.

FIG. 8 is a diagram schematically illustrating an example of a database structure according to a third exemplary embodiment of the invention. As shown in FIG. 8, the database structure includes an entity data group that is stored in a storage area DA1 of a storage device 40, and a link table LT2 and first and second column tables (identifier tables) CT11 and CT12 that are stored in a storage area different from the storage area DA1.

The database structure according to the third exemplary embodiment is the same as that according to the second exemplary embodiment except for the link table LT2.

The link table LT2 has a structure that connects the tuples between the first column table CT11 and the second column table CT12. That is, the link table LT2 includes a plurality of tuples defined in the row direction and first to third attribute fields TID, PT1, and PT2 defined in the column direction. The first attribute field TID includes tuple identifiers R1, R2, R3, and R4 that uniquely indicate the tuples. The second attribute field PT1 includes pointers Vp11, Vp12, Vp13, and Vp14 that designate the addresses allocated to the storage areas of the tuples in the column table CT11. The third attribute field PT2 includes pointers Vp21, Vp22, Vp23, and Vp24 that designate the addresses allocated to the storage areas of the tuples in the column table CT12.

The transaction executing unit 23 can search for data identifiers VR11 to VR24 in the first and second column tables CT11 and CT12 through the link table LT2 and access entity data on the basis of the search result. The database according to the third exemplary embodiment can be considered as a database in which two columns of tabular data are divided into the first column table CT11, the second column table CT12, and the entity data group. Therefore, it is possible to perform a search process for each column at a high speed.

In the third exemplary embodiment, the number of column tables CT11 and CT12 is not limited to two, but it may be three or more. In this case, the link table LT2 also includes attribute fields corresponding to a plurality of column tables.

When the database structure according to the third exemplary embodiment is used, the database system 10 has the following effects. Similar to the second exemplary embodiment, first, it is possible to effectively update the database 41 at a high speed. Second, it is possible to improve the dispersibility of the database.

Third, it is possible to flexibly determine the logical connection of the tuples between the column tables CT11 and CT12. That is, since the link table LT2 has the attribute fields including pointers for each column table, the database structure according to the third exemplary embodiment can more flexibly determine the connection of the tuples between the column tables CT11 and CT12 than the database structure according to the second exemplary embodiment. For example, it is possible to change the logical positions of the data identifiers VR23, VR24, VR22, VR21, . . . in the column table CT12 in the link table LT2 only by changing any one of the values of the pointers Vp21, Vp22, Vp23, and Vp24 in the attribute field PT2 of the link table LT2. In this case, the other column table CT11 is not affected by the change of the logical positions.

In the example shown in FIG. 8, the column table CT11 has the duplicated data identifiers VR12 and VR12. However, it is possible to remove the duplication by changing the pointer in the attribute field PT1 of the link table LT2 (for example, by changing the pointer Vp12 to the pointer Vp11). Therefore, it is possible to compress the amount of data.

Fourth, since the first column table CT11 is logically separated from the second column table CT12, the transaction executing unit 23 can simultaneously perform a search process for the first column table CT11 and a search process for the second column table CT12 in response to a query designating the search conditions. Therefore, it is possible to improve the search speed.

Fourth Exemplary Embodiment

Figure 9:
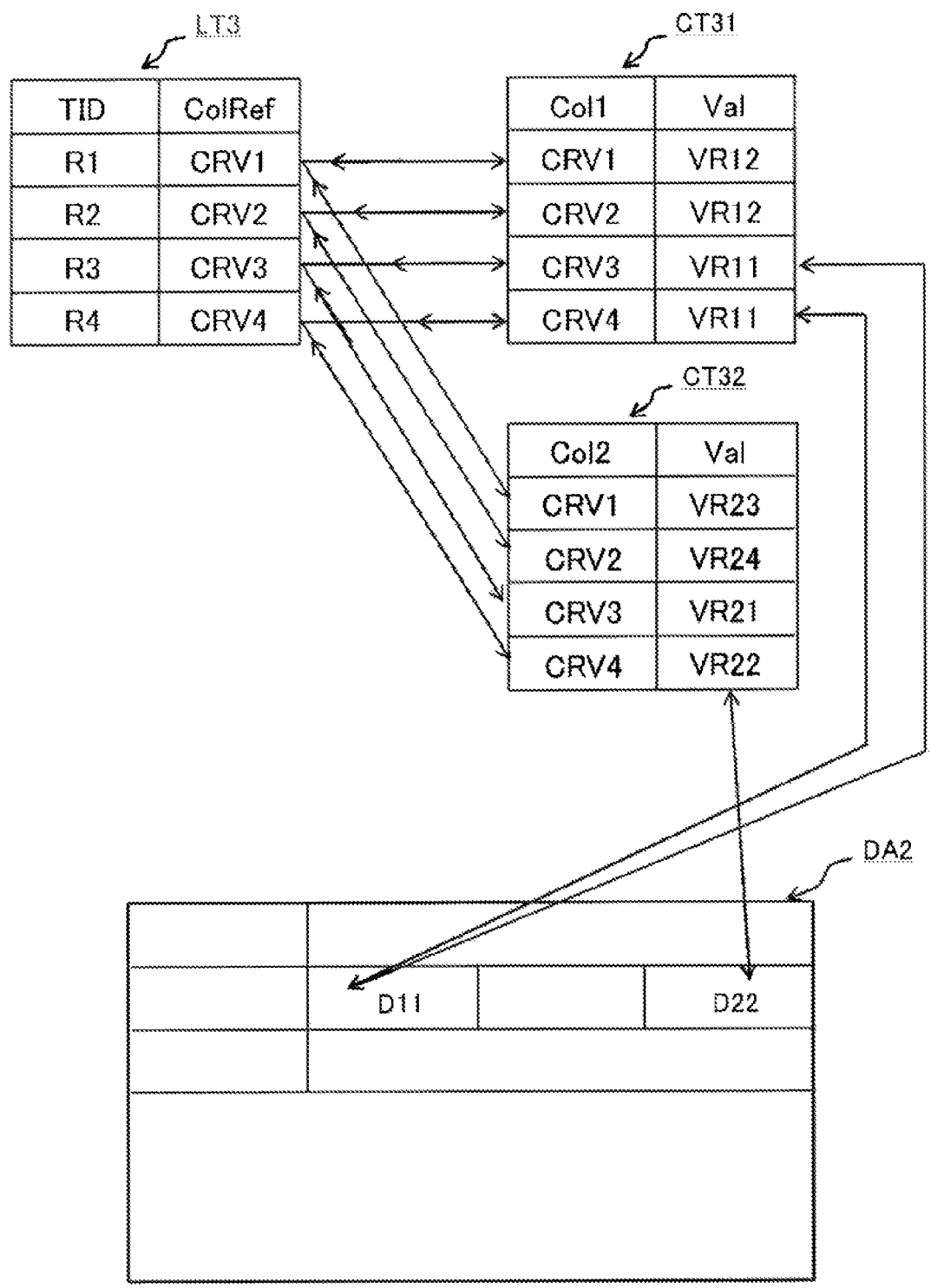
FIG. 9 is a diagram schematically illustrating an example of a database structure according to a fourth exemplary embodiment of the invention.

FIG. 9 is a diagram schematically illustrating an example of a database structure according to a fourth exemplary embodiment of the invention. As shown in FIG. 9, the database structure includes an entity data group that is stored in a storage area DA2 of a storage device 40, and a link table LT3 and first and second column tables (identifier tables) CT31 and CT32 that are stored in a storage area different from the storage area DA2. As described above, the reference table RT0 shown in FIG. 3 has a plurality of attribute fields (columns), and each column includes data identifiers. In this exemplary embodiment, each of the column tables CT31 and CT32 has a data structure corresponding to each column of the reference table RT0 shown in FIG. 3. Each of the data structure of the column table CT31 and the data structure of the column table CT32 may be formed in a storage area in which the addresses are not continuous or a storage area in which the addresses are continuous.

The first column table CT31 includes four tuples defined in the row direction and two attribute fields Col1 and Val defined in the column direction. The attribute field Col1 includes fixed-length tuple identifiers CRV1, CRV2, CRV3, and CRV4 in areas corresponding to the four tuples. The attribute field Val includes fixed-length data identifiers VR12, VR12, VR11, and VR11 in areas corresponding to the four tuples. Each of the tuple identifiers CRV1, CRV2, CRV3, and CRV4 of the first column table CT31 has a value that uniquely indicates the tuples of the first column table CT31.

The second column table CT32 includes four tuples defined in the row direction and two attribute fields Col2 and Val defined in the column direction. The attribute field Colt includes fixed-length tuple identifiers CRV1, CRV2, CRV3, and CRV4 in areas corresponding to the four tuples. The attribute field Val includes fixed-length data identifiers VR23, VR24, VR21, and VR22 in areas corresponding to the four tuples. Each of the tuple identifiers CRV1, CRV2, CRV3, and CRV4 of the second column table CT32 has a value that uniquely indicates the tuples of the second column table CT32.

The data identifiers VR11 to VR24 have values that substantially uniquely indicate the entity data D11 to D24 in the storage area DA2. Therefore, the transaction executing unit 23 can search for the data identifiers VR11 to VR24 and access variable-length entity data on the basis of the search result. The storage area DA2 may have the same conversion table as that shown in FIG. 5 or the same data identifier for searching as that shown in FIG. 6.

It is preferable that data identifiers be stored in continuous areas in each of the column tables CT31 and CT32. In this way, the speed of access to the data identifier increases and the cache hit ratio also increases. Therefore, the search speed is improved. Even when the database 41 is frequently updated, the defragmentation unit 31 reads one group of data identifiers from the storage area at a predetermined timing and writes the read data identifiers to continuous areas. In this way, it is possible to prevent a reduction in the search speed.

The link table LT3 has a structure that connects the tuples between the first column table CT31 and the second column table CT32. That is, the link table LT3 includes four tuples defined in the row direction and two attribute fields TID and ColRef defined in the column direction. The attribute field TID includes tuple identifiers R1, R2, R3, and R4 that uniquely indicate the tuples. The attribute field ColRef includes external tuple identifiers CRV1, CRV2, CRV3, and CRV4 that substantially uniquely indicate the tuples (external tuples) of the column tables CT31 and CT32. The external tuple identifiers CRV1, CRV2, CRV3, and CRV4 have the same values as the tuple identifiers CRV1, CRV2, CRV3, and CRV4 of the first column table CT31 and the second column table CT32, but the invention is not limited thereto. The tuple identifiers may have values corresponding to the external tuple identifiers CRV1, CRV2, CRV3, and CRV4.

Similar to the first exemplary embodiment, the values of the data identifiers VR11 to VR24 included in each of the first and second column tables CT31 and CT32 may be calculated by a one-way hash function. The transaction executing unit 23 can convert a search character string into a hash value, retrieve a data identifier having a value equal to the hash value from the column tables CT31 and CT32, and select entity data corresponding to the retrieved data identifier. In this case, the transaction executing unit 23 searches the column tables CT31 and CT32 including only a fixed-length data group. Therefore, the transaction executing unit 23 can find out a character string at a high speed.

The database according to the fourth exemplary embodiment may be considered as a database in which two columns of tabular data are divided into the first column table CT31, the second column table CT32, and the entity data group. Therefore, it is possible to perform a search process for each column at a high speed.

In this exemplary embodiment, the number of attribute fields in each of the column tables. CT31 and CT32 is two, but is not limited to two. For example, the number of attribute fields in each of the column tables CT31 and CT32 may be set to three or more. In addition, the number of column tables CT31 and CT32 is not limited to two, but it may be three or more.

When the database structure according to the fourth exemplary embodiment is used, the database system 10 has the following effects.

First, similar to the second exemplary embodiment, it is possible to effectively update the database 41 at a high speed. Second, it is possible to improve the dispersibility of the database. Third, it is possible to flexibly determine the logical connection of the tuples between the column tables CT31 and CT32.

Fourth, it is possible to improve the portability of the database. That is, since the data identifiers VR11 to VR24 substantially uniquely indicate the entity data D11 to D24, the dependency of the data identifiers VR11 to VR24 on the hardware structure is low, similar to the tuple identifiers CRV1 to CRV4 and the external tuple identifiers CRV1 to CRV4. Therefore, it is possible to easily port the database according to the fourth exemplary embodiment to other systems.

Fifth Exemplary Embodiment

Figure 10:
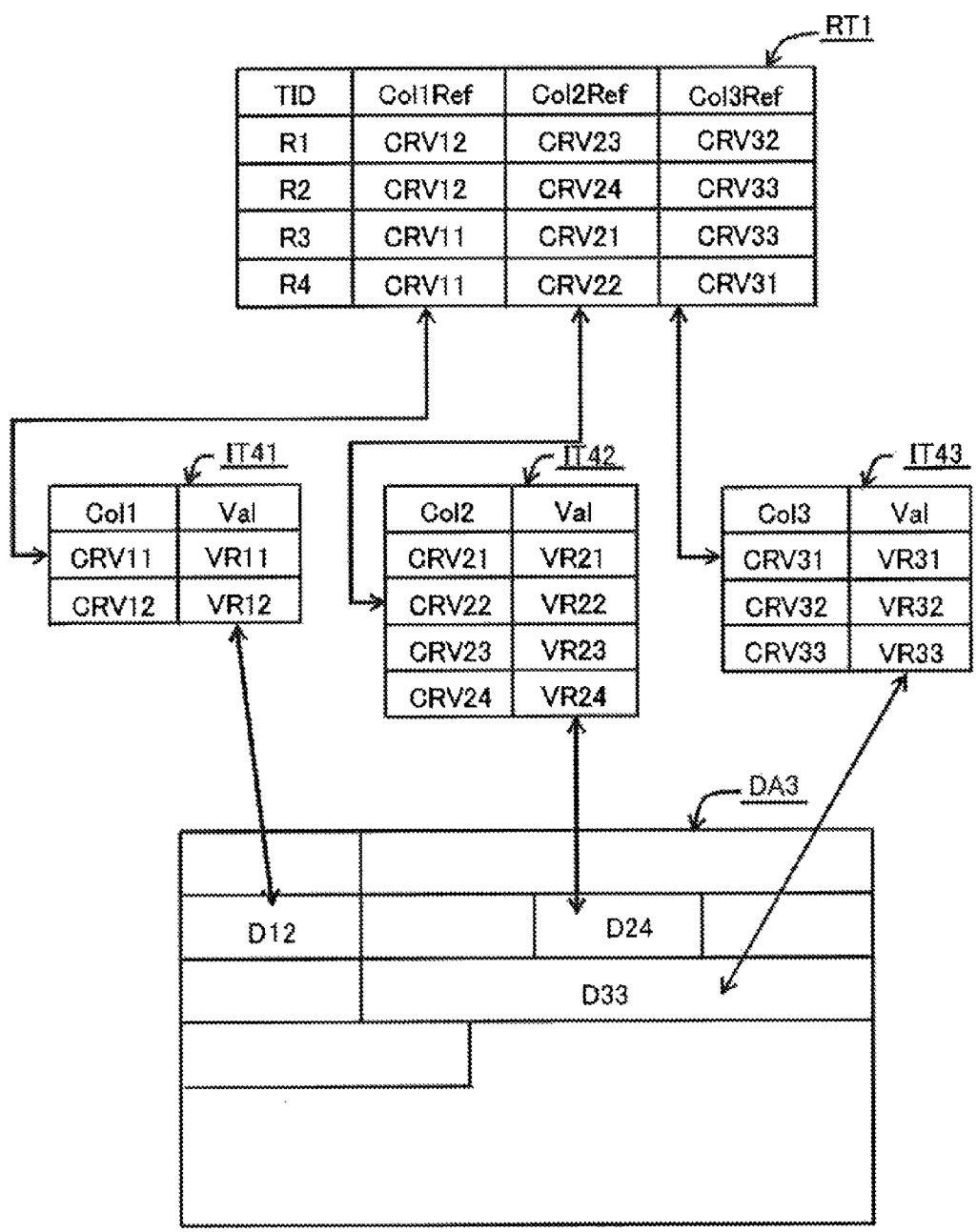
FIG. 10 is a diagram schematically illustrating an example of a database structure according to a fifth exemplary embodiment of the invention.

FIG. 10 is a diagram schematically illustrating an example of a database structure according to a fifth exemplary embodiment of the invention. As shown in FIG. 10, the database structure includes an entity data group that is stored in a storage area DA3 of a storage device 40, and a reference table RT1 and first to third intermediate identifier tables IT41, IT42, and IT43 that are stored in a storage area different from the storage area DA3. The intermediate identifier tables IT41, IT42, and IT43 may be data structures that are stored in a storage area different from the storage area DA3. In this case, the data structure of each of the intermediate identifier tables IT41, IT42, and IT43 may be formed in a storage area in which the addresses are not continuous or a storage area in which the addresses are continuous.

Alternatively, the intermediate identifier tables IT41, IT42, and IT43 may be data structures stored in the storage area DA3. In this case, the storage area DA3 may have the same header area as that shown in FIG. 5 and the data structure of each of the intermediate identifier tables IT41, IT42, and IT43 may be stored in the header area together with a conversion table.

The first intermediate identifier table IT41 includes two tuples defined in the row direction and two attribute fields Col1 and Val defined in the column direction. The attribute field Col1 includes fixed-length tuple identifiers CRV11 and CRV12 in areas corresponding to the two tuples. The attribute field Val includes fixed-length data identifiers VR11 and VR12 in areas corresponding to the two tuples.

The second intermediate identifier table IT42 includes four tuples defined in the row direction and two attribute fields Col2 and Val defined in the column direction. The attribute field Col2 includes fixed-length tuple identifiers CRV21, CRV22, CRV23, and CRV24 in areas corresponding to the tour tuples. The attribute field Val of the second intermediate identifier table IT42 includes fixed-length data identifiers VR21, VR22, VR23, and VR24 in areas corresponding to the four tuples.

The third intermediate identifier table IT43 includes three tuples defined in the row direction and two attribute fields Col3 and Val defined in the column direction. The attribute field Col3 includes fixed-length tuple identifiers CRV31, CRV32, and CRV33 in areas corresponding to the three tuples. The attribute field Val of the third intermediate identifier table IT43 includes fixed-length data identifiers VR31, VR32, and VR33 in areas corresponding to the three tuples.

The first to third intermediate identifier tables IT41, IT42, and IT43 have data identifiers VR11 to VR33 that substantially uniquely indicate entity data D11 to D33 in the storage area DA3.

The reference table RT1 has reference identifiers CRV11 to CRV33 that substantially uniquely indicate the data identifiers VR11 to VR33 in the first to third intermediate identifier tables IT41 to IT43, respectively. In this exemplary embodiment, the reference identifiers CRV11 to CRV33 have the same shape as the tuple identifiers CRV11 to CRV33 in the first to third intermediate identifier tables IT41 to IT43. In this way, the reference identifiers CRV11 to CRV33 substantially uniquely indicate the data identifiers VR11 to VR33, respectively. For example, the values of the reference identifiers CRV11 to CRV33 may be the values of the hash function when the data identifiers VR11 to VR33 are input.

As shown in FIG. 10, the reference table RT1 includes four tuples defined in the row direction and first to fourth attribute fields TID, Col1Ref, Col2Ref, and Col3Ref defined in the column direction. The first attribute field TID includes tuple identifiers R1, R2, R3, and R4 that uniquely indicate the tuples. The second attribute field Col1Ref includes a set of reference identifiers CRV12, CRV12, CRV11, and CRV11 that substantially uniquely indicate the data identifiers VR11 and VR12 of the first intermediate identifier table IT41. The third attribute field Col2Ref includes a set of reference identifiers CRV21, CRV22, CRV23, and CRV24 that substantially uniquely indicate the data identifiers VR21, VR22, VR23, and VR24 of the second intermediate identifier table IT42. The fourth attribute field Col3Ref includes a set of reference identifiers CRV31, CRV32, and CRV33 that substantially uniquely indicate the data identifiers VR31, VR32, and VR33 of the third intermediate identifier table IT43.

For example, a "location", a "company name", and an "age group" can be set as the names (attribute names) of the attribute fields Col1Ref, Col2Ref, and Col3Ref in the reference table RT1. The data identifiers CRV12, CRV23, and CRV32 in the tuple (record) corresponding to the tuple identifier R1 uniquely indicate the data identifiers VR12, VR23, and VR32, respectively, and the data identifiers VR12, VR23, and VR32 uniquely indicate the entity data D12, D23, and D32 of "Shinagawa", "N company", and "twenties", respectively. Similarly, the data identifiers CRV12, CRV24, and CRV33 in the tuple corresponding to the tuple identifier R2 uniquely indicate the data identifiers VR12, VR24, and VR33, respectively, and the data identifiers VR12, VR24, and VR33 uniquely indicate the entity data D12, D24, and D33 of "Tamachi", "A company", and "thirties", respectively. The data identifiers CRV11, CRV21, and CRV33 in the tuple corresponding to the tuple identifier R3 uniquely indicate the data identifiers VR11, VR21, and VR33, respectively, and the data identifiers VR11, VR21, and VR33 uniquely indicate the entity data D11, D21, and D33 of "Tamachi", "A company", and "thirties", respectively. The data identifiers CRV11, CRV22, and CRV31 in the tuple corresponding to the tuple identifier R4 uniquely indicate the data identifiers VR11, VR22, and VR31, respectively, and the data identifiers VR11, VR22, and VR31 uniquely indicate the entity data D11, D22, and D31 of "Tamachi", "S company", and "forties", respectively.

Similar to the first exemplary embodiment, the values of the data identifiers VR11 to VR33 included in each of the first to third intermediate identifier tables IT41, IT42, and IT43 may be calculated by using a one-way hash function. The values of the reference identifiers CRV11 to CRV33 can be calculated by using a hash function. For example, the output values of the hash function when the values of the data identifiers VR11 to VR33 are input may be used as the values of the reference identifiers CRV11 to CRV33. The transaction executing unit 23 can convert a search character string into a hash value, retrieve a reference identifier having a value equal to the hash value from the reference table RT1, and access entity data corresponding to the retrieved reference identifier. In this case, the transaction executing unit 23 searches the reference table RT1 including only a fixed-length data group. Therefore, the transaction executing unit 23 can find out a character string at a high speed.

The transaction executing unit 23 can search for the reference identifiers CRV11 to CRV33 and the data identifiers VR11 to VR33 and access variable-length entity data on the basis of the search result. The storage area DA3 may have the same conversion table as that shown in FIG. 5 or the same data identifier for searching as that shown in FIG. 6.

Each of the first to third intermediate identifier tables IT41, IT42, and IT43 has a data structure excluding redundancy, because the data identifiers having the same value are excluded. In this way, it is possible to effectively use the storage area.

It is preferable that the data identifiers be stored in continuous areas in each of the first to third intermediate identifier tables IT41 to IT43. It is preferable that the reference identifiers CRV11 to CRV33 be stored in continuous areas in the reference table RT1. In this way, the speed of access to the data identifiers and the reference identifiers increases and the cache hit ratio also increases. As a result, the search speed is improved.

Even when the database 41 is frequently updated, the defragmentation unit 31 reads one group of data identifiers or one group of reference identifiers from the storage area at a predetermined timing and writes the read data identifiers or reference identifiers to continuous areas. In this way, it is possible to prevent a reduction in the search speed.

The defragmentation unit 31 has a function of rearranging a plurality of data identifiers in the attribute field Val in increasing order or decreasing order of the values of the reference identifiers corresponding to the data identifier in each of the first to third intermediate identifier tables IT41 to IT43. In this way, it is possible to effectively perform a search process.

When the database structure according to the fifth exemplary embodiment is used, the database system 10 has the following effects.

First, it is possible to effectively update the database 41 at a high speed. That is, the database according to the fifth exemplary embodiment includes a plurality of entity data and a plurality of data identifiers VR11 to VR33 that substantially uniquely indicates the entity data. Therefore, when the record is updated, added, or removed, the update of the reference table RT1 as well as the intermediate identifier tables IT41 to IT43 is minimized. Therefore, even when the database 41 is frequently updated, the update can be effectively performed at a high speed.

For example, when a new record is added (inserted), the transaction executing unit 23 converts the record into a reference record including the reference identifiers and newly adds the reference record to the reference table RT1 so as to be associated with the tuple identifier R5. Then, the transaction executing unit 23 determines whether the reference identifier (new reference identifier) in the newly added reference record is in the existing reference record corresponding to the tuple identifiers R1 to R4. When it is determined that the new reference identifier is in the existing reference record, the transaction executing unit 23 ends the update process for the database 41. On the other hand, when it is determined that the new reference identifier is not in the existing reference record, the transaction executing unit 23 adds a data identifier corresponding to the new reference identifier to any one of the intermediate identifier tables IT41 to IT43 and adds entity data corresponding to the new reference identifier to the storage area DA3.

When the new reference identifier is in the existing reference record, only the reference table RT1 is updated. Therefore, it is possible to complete the update of the database 41 in a short time. For example, when the reference record to be newly added includes a new reference identifier CRV13 that does not exist in the reference table RT1, a tuple identifier CRV13 and a data identifier VR13 are added to the intermediate identifier table IT41. At the same time, entity data D13 is added to the storage area DA3. On the other hand, when the reference record to be newly added includes only a new reference identifier CRV11 that has previously existed in the reference table RT1, the intermediate identifier tables IT41 to IT43 and the entity data group are not updated.

Second, it is possible to improve the dispersibility of the database. The intermediate identifier tables IT41 to IT43 are completely separated from the entity data group. Therefore, similar to the first exemplary embodiment, it is easy to arrange the intermediate identifier tables IT41 to IT43 and the entity data group so as to be dispersed. In addition, it is easy to arrange the intermediate identifier tables IT41 to IT43 and the reference table RT1 so as to be dispersed.

Sixth Exemplary Embodiment

Figure 11:
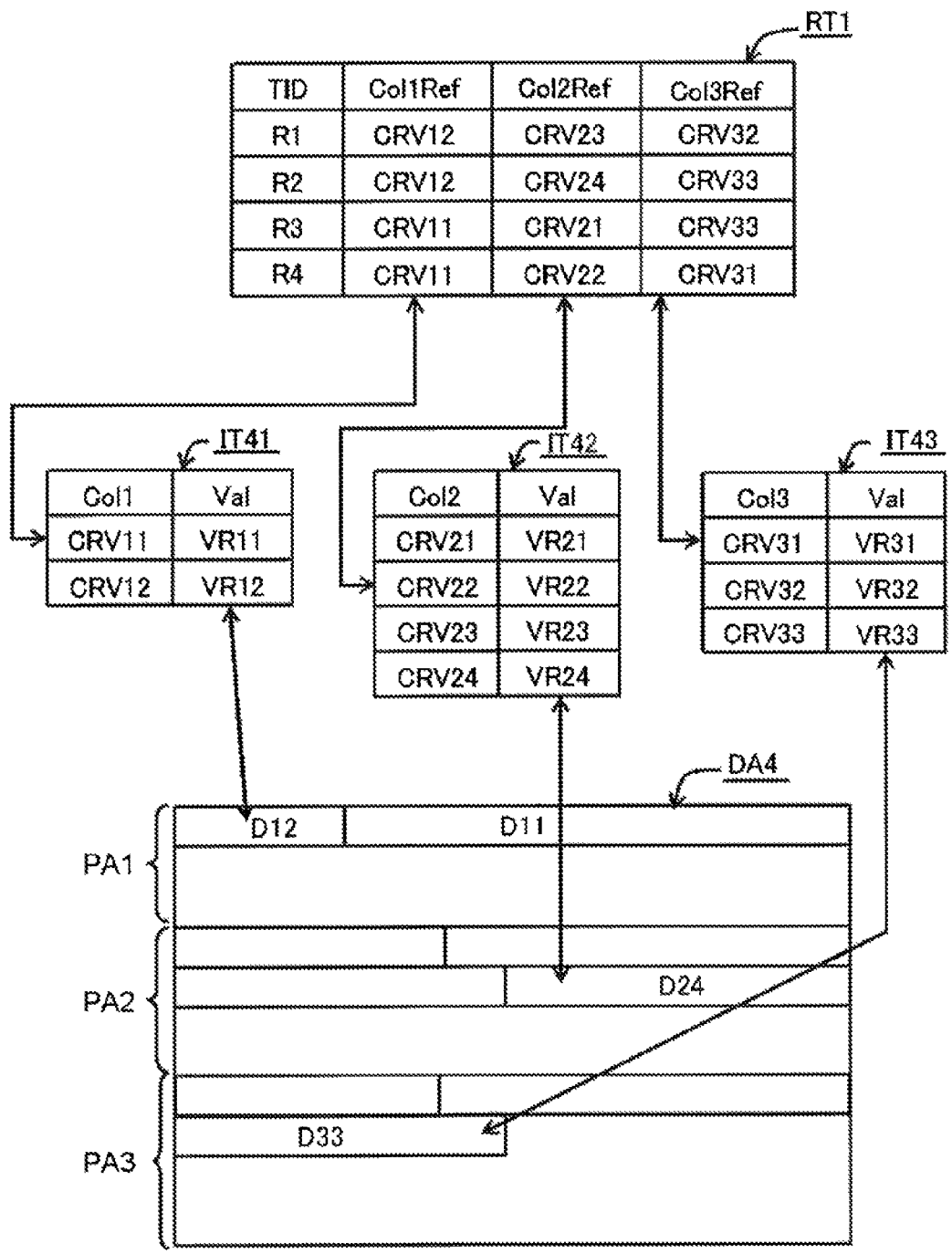
FIG. 11 is a diagram schematically illustrating an example of a database structure according to a sixth exemplary embodiment of the invention.

FIG. 11 is a diagram schematically illustrating an example of a database structure according to a sixth exemplary embodiment of the invention. As shown in FIG. 11, the database structure includes an entity data group that is stored in a storage area DA4 of a storage device 40, and a reference table RT1 and first to third intermediate identifier tables IT41, IT42, and IT43 that are stored in a storage area different from the storage area DA4.

In this exemplary embodiment, the storage area DA4 allocated to the entity data group is divided into a plurality of partition areas PA1, PA2, and PA3. The partition areas PA1, PA2, and PA3 are allocated so as to store different types of entity data in the entity data group. For example, only integer-type entity data is stored in the partition area PA1. Only character string-type entity data is stored in the partition area PA2. Only date-type entity data is stored in the partition area PA3. In this exemplary embodiment, the number of partition areas PA1, PA2, and PA3 is three, but is not limited thereto.

As such, when the entity data is stored in the partition areas corresponding to the types of entity data, it is possible to effectively use the storage area DA4.

Seventh Exemplary Embodiment

Figure 12A:
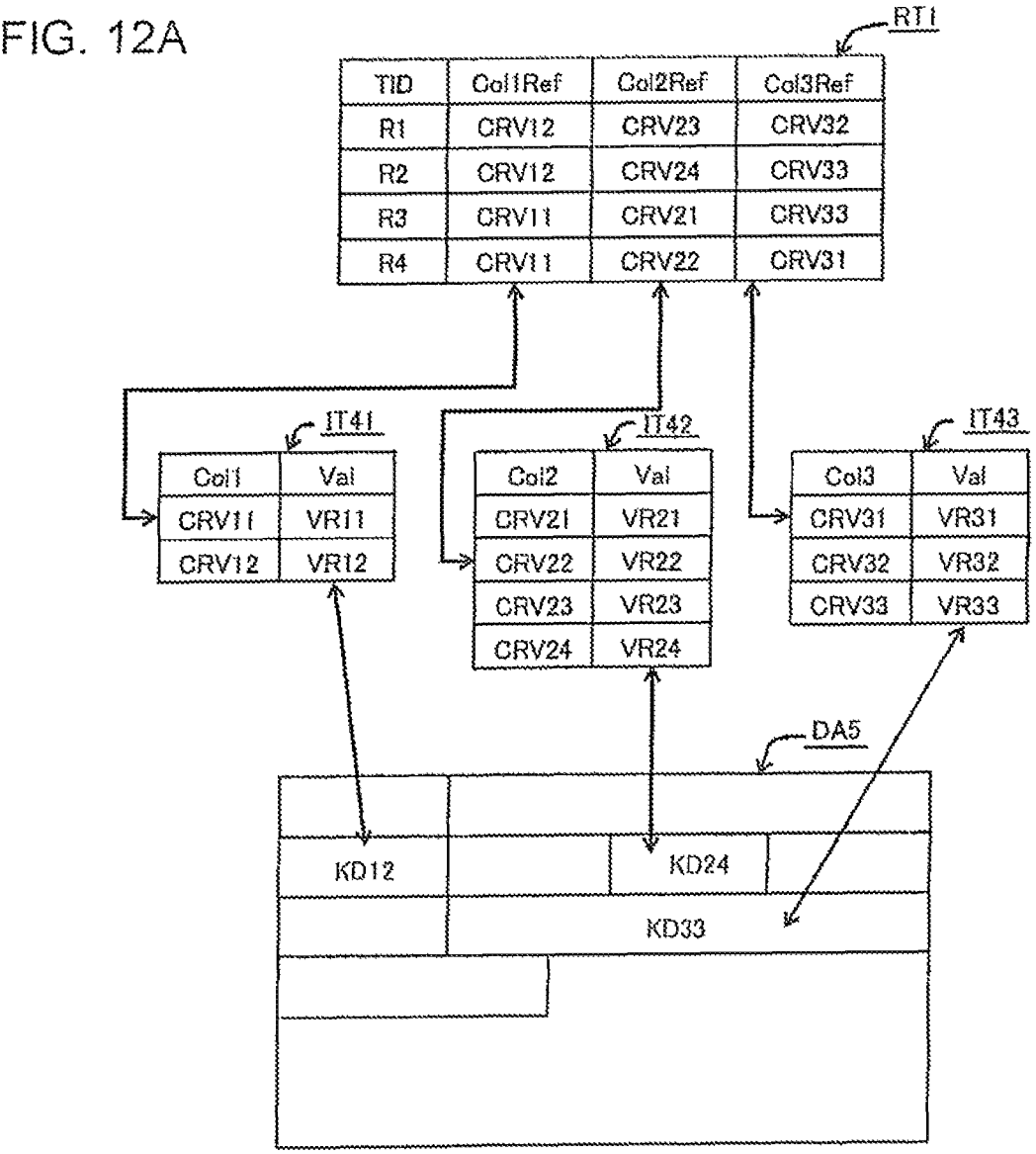
FIGS. 12A and 12B are diagrams schematically illustrating an example of a database structure according to a seventh exemplary embodiment of the invention.
Figure 12B:
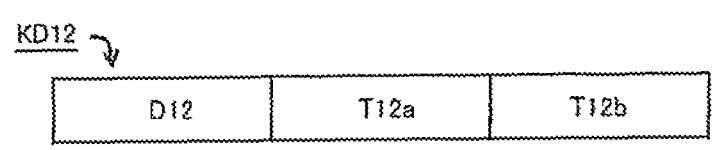

FIGS. 12A and 12B are diagrams schematically illustrating an example of a database structure according to a seventh exemplary embodiment of the invention. As shown in FIG. 12A, the database structure includes an entity data group that is stored in a storage area DA5 of a storage device 40, and a reference table RT1 and first to third intermediate identifier tables IT41, IT42, and IT43 that are stored in a storage area different from the storage area DA5.

In this exemplary embodiment, similar to the fifth exemplary embodiment, the first to third intermediate identifier tables IT41, IT42, and IT43 include data identifiers VR11 to VR33 that substantially uniquely indicate entity data D11 to D33 in the storage area DA5, respectively. However, the entity data D11 to D33 is included in combination data KD11 to KD33, respectively. In each of the first to third intermediate identifier tables IT41, IT42, and IT43, the data identifiers having the same value are excluded.

FIG. 12B is a diagram schematically illustrating the structure of the combination data KD12. The combination data KD12 includes entity data D12, first sub-entity data T12a, and second sub-entity data T12b. The entity data D12, the first sub-entity data T12a, and the second sub-entity data T12b are stored in continuous storage areas.

The first sub-entity data T12a and the second sub-entity data T12b have content related to the entity data D12. For example, when the entity data D12 is binary data, the first sub-entity data T12a may be text data indicating the content of the binary data. When the entity data D12 indicates the content of character string-type data "11", the first sub-entity data T12a may indicate the content of integer-type data "11", and the second sub-entity data T12b may indicate the content of floating-point-type data "11.00". Alternatively, when the entity data D12 indicates the content of Japanese text, the first sub-entity data T12a may indicate the content of English text and the second sub-entity data T12b may indicate the content of Russian text.

When selecting the entity data D12 in response to a query request by searching the reference table RT1 and the intermediate identifier tables IT41 to IT43, the transaction executing unit 23 can read the entity data D12 and the sub-entity data T12a and T12b. Alternatively, the transaction executing unit 23 may read the sub-entity data T12a or T12b instead of the entity data D12.

When the database structure according to the seventh exemplary embodiment is used, the transaction executing unit 23 successfully evades converting the entity data D12 read from the database 41 into the first sub-entity data T12a or the second sub-entity data T12b in response to a query request. Therefore, it is possible to improve a response speed to the query.

Eighth Exemplary Embodiment

Figure 13:
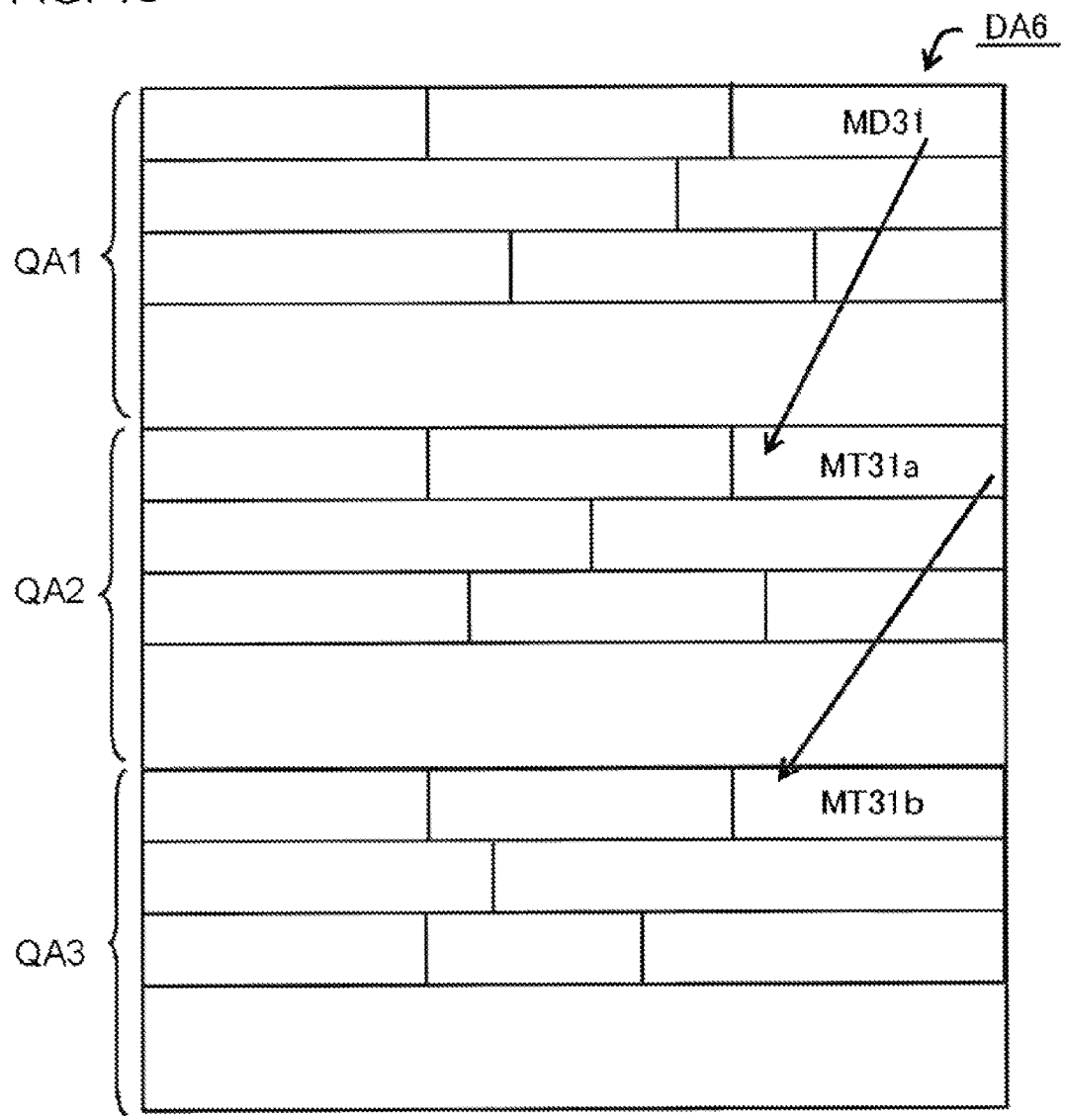
FIG. 13 is a diagram schematically illustrating a portion of a database structure according to an eighth exemplary embodiment of the invention.

FIG. 13 is a diagram schematically illustrating a portion of a database structure according to an eighth exemplary embodiment of the invention. As shown in FIG. 13, the database structure includes an entity data group that is stored in a storage area DA6 of a storage device 40, and a reference table RT1 (not shown) and first to third intermediate identifier tables IT41, IT42, and IT43 (not shown) that are stored in a storage area different from the storage area DA6.

In this exemplary embodiment, combination data MD11 to MD33 including entity data D11 to D33 respectively corresponding to data identifiers VR11 to VR33 of the intermediate identifier tables IT41, IT42, and IT43 are stored in a partition area QA1 of the storage area DA6. Combination data MT11a to MT33a including sub-entity data T11a to T33a having content related to the entity data D11 to D33 are stored in a partition area QA2 of the storage area DA6. Combination data MT11b to MT33b including sub-entity data T11b to T33b having content related to the entity data D11 to D33 are stored in a partition area QA3 of the storage area DA6.

Figure 14:
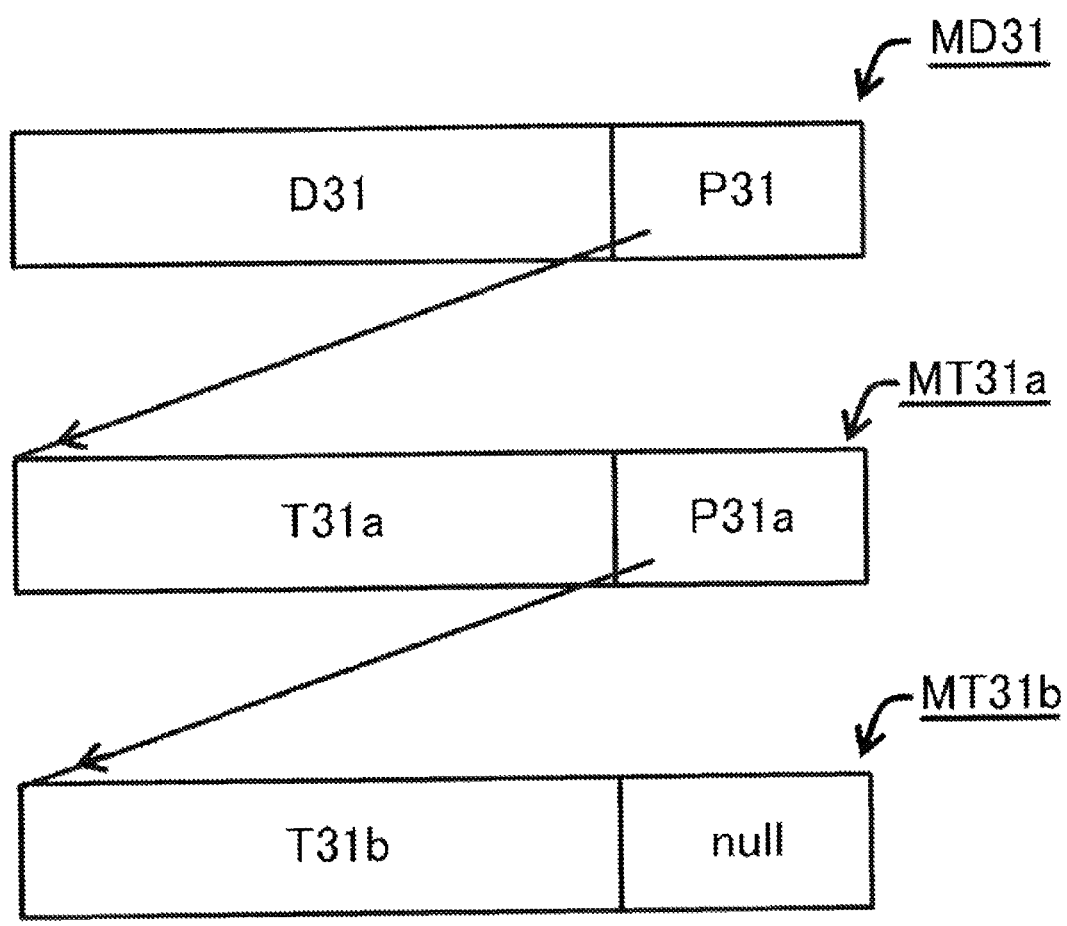
FIG. 14 is a diagram illustrating the logical connection between entity data and sub-entity data.

As shown in FIG. 14, position data P31 indicating the position of the storage area of the sub-entity data T31a having content related to the entity data D31 is added to the entity data D31 forming the combination data MD31. In addition, position data P31a indicating the position of the storage area of the sub-entity data T31b having content related to the entity data D31 is added to the sub-entity data T31a.

As such, in the database structure according to this exemplary embodiment, the entity data D31 is logically connected to the sub-entity data T31a and T31b. The position data P31 and P31a may be addresses designating the absolute position of the storage areas, offsets designating the relative positions of the storage areas, or pointers designating the addresses allocated to the storage areas, similar to other entity data.

When selecting the entity data D31 in response to a query request by searching the reference table RT1 and the intermediate identifier tables IT41 to IT43, the transaction executing unit 23 can read the entity data D31 and the sub-entity data T31a and T31b. Alternatively, the transaction executing unit 23 may read the sub-entity data T31a or T31b instead of the entity data D31.

Therefore, when the database structure according to the eighth exemplary embodiment is used, the transaction executing unit 23 does not convert the entity data D31 read from the database 41 into the first sub-entity data T31a or the second sub-entity data T31b in response to a query request. Therefore, it is possible to improve a response speed to the query.

Ninth Exemplary Embodiment

Figure 15:
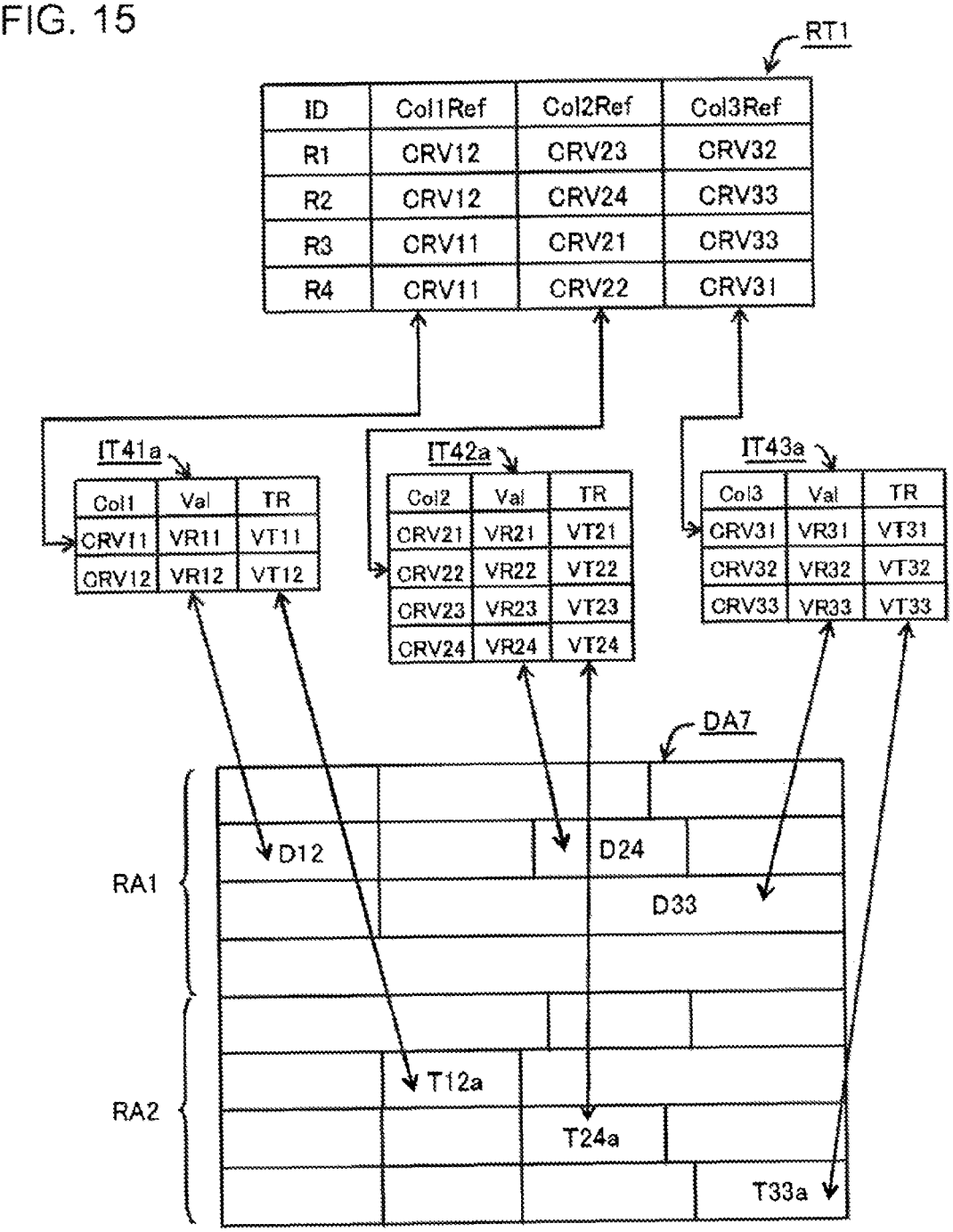
FIG. 15 is a diagram schematically illustrating an example of a database structure according to a ninth exemplary embodiment of the invention.

FIG. 15 is a diagram schematically illustrating an example of a database structure according to a ninth exemplary embodiment of the invention. As shown in FIG. 15, the database structure includes an entity data group that is stored in a storage area DA7 of a storage device 40, and a reference table RT1 and first to third intermediate identifier tables IT41a, IT42a, and IT43a that are stored in a storage area different from the storage area DA7.

Entity data D11 to D33 are stored in a partition area RA1 of the storage area DA7. Sub-entity data T11a to T33a having content related to the entity data D11 to D33 are stored in a partition area RA2 of the storage area DA7.

The intermediate identifier table IT41a includes an attribute field TR in addition to the attribute fields Col1 and Val of the intermediate identifier table IT41 (FIG. 10). The attribute field TR includes sub-data identifiers VT11 and VT12 that are in one-to-one correspondence with the data identifiers VR11 and VR12 in the attribute field Val and substantially uniquely indicate the sub-entity data T11a and T12a, respectively. Similarly, the intermediate identifier table IT42a includes an attribute field TR in addition to the attribute fields Col1 and Val of the intermediate identifier table IT42 (FIG. 10). The attribute field TR includes sub-data identifiers VT21 to VT24 that are in one-to-one correspondence with the data identifiers VR21 to VR24 in the attribute field Val and substantially uniquely indicate the sub-entity data T21a to T24a, respectively. The intermediate identifier table IT43a includes an attribute field TR in addition to the attribute fields Col3 and Val of the intermediate identifier table IT43 (FIG. 10). The attribute field TR includes sub-data identifiers VT31 to VT33 that are in one-to-one correspondence with the data identifiers VR31 to VR33 in the attribute field Val and substantially uniquely indicate the sub-entity data T31a to T33a, respectively. The value of the sub-data identifiers VT11 to VT33 may be calculated by a hash function that outputs a fixed-length bit string when sub-entity data is input.

When selecting, for example, entity data D12 from the entity data group in response to a query request by searching the reference table RT1 and the intermediate identifier tables IT41a to IT43a, the transaction executing unit 23 can read the sub-entity data T12a having content related to the selected entity data D12 using the sub-data identifier VT12. Alternatively, the transaction executing unit 23 may read the sub-entity data T12a instead of the entity data D12.

Therefore, when the database structure according to the ninth exemplary embodiment is used, the transaction executing unit 23 successfully evades converting the entity data D12 read from the database 41 into the sub-entity data T12a in response to a query request. Therefore, it is possible to improve a response speed to the query.

Tenth Exemplary Embodiment

Figure 16:
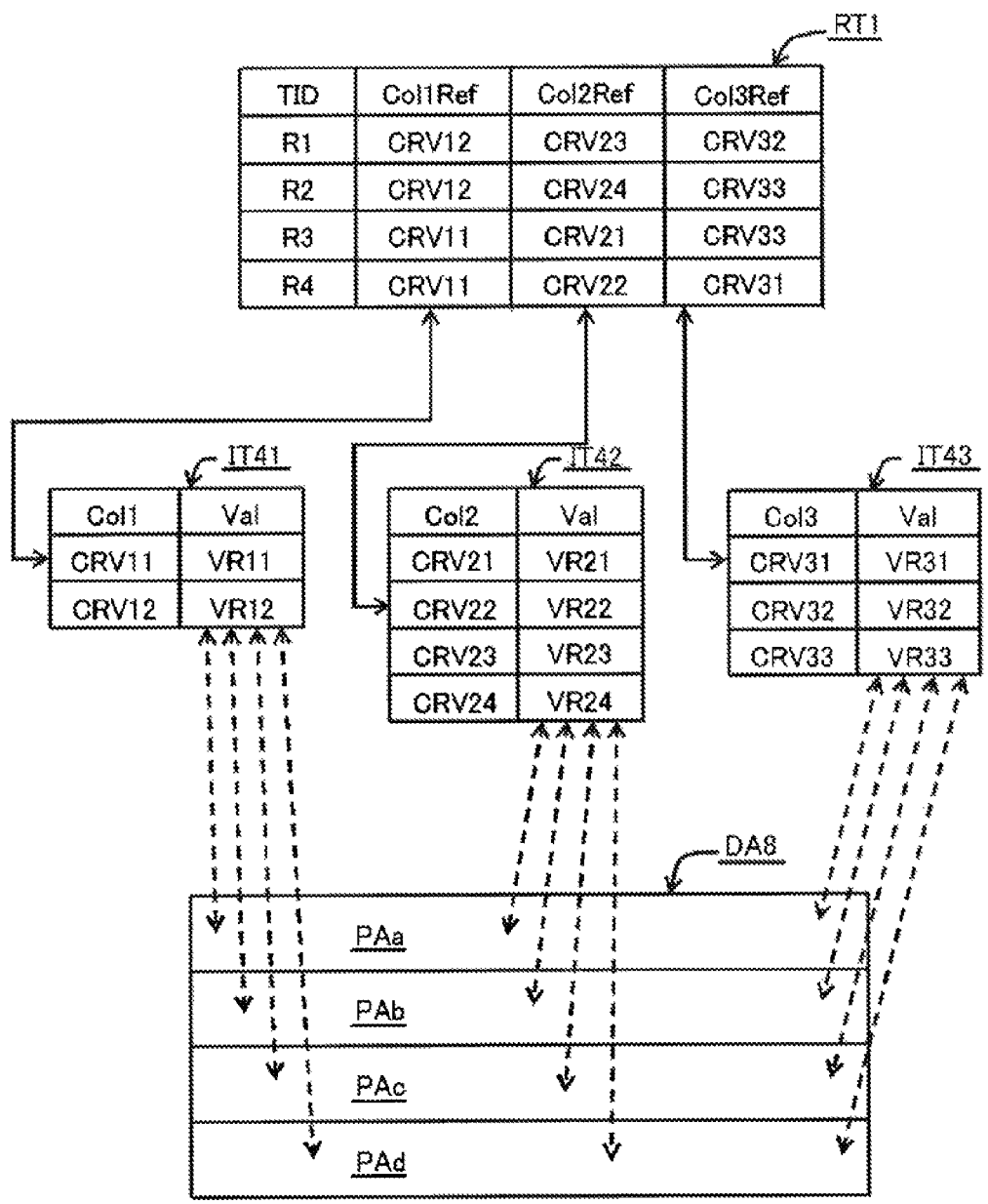
FIG. 16 is a diagram schematically illustrating an example of a database structure according to a tenth exemplary embodiment of the invention.

FIG. 16 is a diagram schematically illustrating an example of a database structure according to a tenth exemplary embodiment of the invention. As shown in FIG. 16, the database structure includes an entity data group that is stored in a storage area DA8 of a storage device 40, and a reference table RT1 and first to third intermediate identifier tables IT41, IT42, and IT43 that are stored in a storage area different from the storage area DA8.

In this exemplary embodiment, the storage area DA8 allocated to the entity data group is divided into a plurality of partition areas PAa, PAb, PAc, and PAd. The partition areas PAa, PAb, PAc, and PAd are allocated as areas in which entity data having different combinations of a data type and a data format in the entity data group are stored. Examples of the data type include an integer type, a character string-type, and a date type. Examples of the data format include a Japanese format and an English format. However, the invention is not limited thereto.

FIG. 17 is a diagram (conversion table) illustrating the correspondence between the partition areas and combinations of the data type and the data format. The database structure according to this exemplary embodiment may include the conversion table shown in FIG. 17, or the conversion table shown in FIG. 17 may be stored in a storage area different from the storage area allocated to the database 41. As shown in the conversion table of FIG. 17, only the entity data group having a combination of data format 1 and data type 1 is stored in the partition area PAa, and only the sub-entity data group having a combination of data format 2 and data type 1 is stored in the partition area PAb. In addition, only the sub-entity data group having a combination of data format 1 and data type 2 is stored in the partition area PAc, and only the sub-entity data group having a combination of data format 2 and data type 2 is stored in the partition area PAd.

The transaction executing unit 23 can select one storage area from the partition areas PAa to PAd with reference to the conversion table shown in FIG. 17 in response to a query request and read entity data or sub-entity data from the selected storage area.

Therefore, when the database structure according to the tenth exemplary embodiment is used, the transaction executing unit 23 successfully evades converting the entity data read from the database 41 into the sub-entity data in response to a query request. Therefore, it is possible to improve a response speed to the query.

The exemplary embodiments of the invention have been described above with reference to the drawings, but the invention is not limited to the above-described exemplary embodiments. It will be understood by those skilled in the art that the structure or details of the invention can be changed in various ways within the scope of the invention.

The above-described exemplary embodiments of the invention are illustrative, and the invention can adopt various structures other than the above-mentioned structures. For example, in the above-described exemplary embodiments, a process suitable to perform a transaction on the database 41 is performed, but the invention is not limited thereto. As described above, the transaction is a process satisfying the ACID characteristics, but the database structure according to the invention can also be applied to data processing that does not satisfy all of the ACID characteristics.

In the above-described exemplary embodiments, the query receiving unit 21 receives a query described with a query language, and the analysis unit 22 analyzes the query. However, the invention is not limited thereto. For example, the query may not be described with the query language, but may simply include a value for calling an application programming interface (API) function for a database.

The structure of the storage area DA4, DA5, DA6, DA7, or DA8 according to the sixth to tenth exemplary embodiments may be applied instead of the storage area DA0, DA1, DA2, or DA3 according to the first to fifth exemplary embodiments.

The column tables CT11 and CT12 according to the second exemplary embodiment or the third exemplary embodiment may be stored in separate storage areas or continuous storage areas. The column tables CT11 and CT12 may be incorporated into the header area of the storage area in which the entity data group is stored. The column tables CT31 and CT32 according to the fourth exemplary embodiment may be stored in separate storage areas or continuous storage areas, or they may be incorporated into the header area of the storage area in which the entity data group is stored. Similarly, the intermediate identifier tables IT41 to IT43 according to each of the fifth to seventh exemplary embodiments and the tenth exemplary embodiment may be stored in separate storage areas or continuous storage areas, or they may be incorporated into the header area of the storage area in which the entity data group is stored, similar to the intermediate identifier tables IT41*a* to IT43*a* according to the ninth exemplary embodiment.

As described above, the database according to each of the second, third, and fourth exemplary embodiments has a structure capable of dividing N columns (N is an integer equal to or greater than 2) of tabular data into one link table, N column tables, and an entity data group. Therefore, it is possible to perform a search process for each column at a high speed. The database according to the first exemplary embodiment has a structure capable of dividing M (M is an integer equal to or greater than 2) rows and N columns of tabular data into an identifier table of M rows by N columns and an entity data group. Therefore, it is possible to perform a search process for each column at a higher speed than that in the databases according to the second, third, and fourth exemplary embodiments. Therefore, when N, the number of tabular data columns, is equal to or more than a predetermined value, it is preferable to divide the tabular data into N column tables, a link table, and an entity data group as in the second, third, or fourth exemplary embodiment, in order to improve the search speed for each column. When N, the number of tabular data columns, is equal to or more than a predetermined value, it is preferable to divide the tabular data into an identifier table of M rows by N columns and an entity data group as in the first exemplary embodiment, in order to improve the search speed for each row.

The invention claimed is:

1. A database system comprising:
a storage unit that stores a database including an entity data group containing a plurality of entity data and a plurality of identifier tables having only a plurality of fixed-length data; and
a data processing unit that receives a query and performs data processing on the database on the basis of the received query,
wherein each of the identifier tables includes at least one tuple that is defined in a row direction and at least one attribute field that is defined in a column direction, stores a plurality of data identifiers uniquely indicating the plurality of entity data as the fixed-length data, and has a data structure corresponding to the at least one attribute field into which a tabular data having a plurality of tuples including the plurality of data identifiers according to a plurality of attribute fields is divided,
the database further includes a link table that links corresponding tuples between the identifier tables, and includes at least one tuple including data to link the plurality of data identifiers, which are stored in the identifier tables,
the plurality of data identifiers is stored in each of the identifier tables sequentially,
the data processing unit performs the data processing using the link table and the identifier tables,
the database includes a plurality of sub-entity data having content related to the plurality of entity data,
the identifier table further includes sub-data identifiers that are in one-to-one correspondence with the data identifiers and uniquely indicate the sub-entity data, and
when selecting entity data from the entity data group by searching the identifier table, the data processing unit reads sub-entity data having content related to the selected entity data from the database using the sub-data identifiers.

2. The database system according to claim 1, wherein a storage area allocated to the identifier table is different from a storage area allocated to the entity data group.

3. The database system according to claim 1, wherein the values of the data identifiers are output values of a hash function that outputs a fixed-length bit string when the entity data is input.

4. The database system according to claim 1, wherein the attribute field of the link table includes an offset designating the relative position of the storage area of the tuple of each of the identifier tables.

5. The database system according to claim 1, wherein the attribute field of the link table includes a pointer indicating an address allocated to the storage area of the tuple of each of the identifier tables.

6. The database system according to claim 1, wherein the attribute field of the link table includes an external tuple identifier that uniquely indicates the tuple of each of the identifier tables,
each of the identifier tables includes a plurality of attribute fields, and
one of the plurality of attribute fields of each of the identifier tables includes a tuple identifier that uniquely indicates the tuple of each of the identifier tables and has a value corresponding to the external tuple identifier.

7. The database system according to claim 6, wherein the external tuple identifier is a fixed-length bit string.

8. The database system according to claim 1, wherein the database includes a conversion table indicating a correspondence relation between pieces of position data indicating the storage areas of the plurality of entity data and the plurality of data identifiers, and
the data processing unit selects entity data from the entity data group using the conversion table and performs the data processing on the basis of the selection result.

9. The database system according to claim 8, wherein the position data is an address designating the absolute position of the storage area of the entity data.

10. The database system according to claim 8, wherein the position data is an offset designating the relative position of the storage area of the entity data.

11. The database system according to claim 1, wherein data identifiers for searching having the same values as the plurality of data identifiers are added to the plurality of entity data, and
the data processing unit searches for the data identifiers for searching, selects the entity data on the basis of the search result, and performs the data processing by using the selection result.

12. The database system according to claim 1, wherein the plurality of entity data includes variable-length data.

13. The database system according to claim 1, wherein
the storage area allocated to the entity data group is divided into a plurality of partition areas, and
the plurality of partition areas is allocated as areas that store different types of entity data in the entity data group.

14. The database system according to claim 1, wherein
the database includes a plurality of sub-entity data having content related to the plurality of entity data,
the entity data and the sub-entity data having content related to the entity data are stored in continuous storage areas, and
when selecting entity data from the entity data group by searching the identifier table, the data processing unit reads sub-entity data having content related to the selected entity data from the database.

15. The database system according to claim 1, wherein
the database includes a plurality of sub-entity data having content related to the plurality of entity data,
a set of position data indicating the position of the storage area of the sub-entity data having content related to the entity data is added to the entity data, and
when selecting entity data from the entity data group by searching the identifier table, the data processing unit reads sub-entity data designated by the position data added to the selected entity data from the database.

16. The database system according to claim 15, wherein
the position data indicating the position of the storage area of the sub-entity data is an address designating the absolute position of the storage area of the sub-entity data.

17. The database system according to claim 15, wherein
the position data indicating the position of the storage area of the sub-entity data is an offset designating the relative position of the storage area of the sub-entity data.

18. The database system according to claim 1, wherein
the database includes at least one sub-entity data group having content related to the entity data group,
the storage unit includes a first storage area allocated to the entity data group and a second storage area allocated to the sub-entity data group, and
the data processing unit selects one of the first storage area and the second storage area on the basis of the received query.

19. The database system according to claim 1, wherein
the query is described with a query language, and
the data processing unit analyzes the query and performs a transaction as the data processing on the database on the basis of the analysis result.

20. A method of managing a database, comprising:
receiving a query for a database including an entity data group containing a plurality of entity data and a plurality of identifier tables having only a plurality of fixed-length data; and
performing data processing on the database on the basis of the received query,
wherein each of the identifier tables includes at least one tuple that is defined in a row direction and at least one attribute field that is defined in a column direction, stores a plurality of data identifiers uniquely indicating the plurality of entity data as the fixed-length data, and has a data structure corresponding to at least one attribute field into which a tabular data having said at least one tuple including the plurality of data identifiers according to a plurality of attribute fields is divided,
the database further includes a link table that links corresponding tuples between the identifier tables, and includes at least one tuple including data to link the plurality of data identifiers, which are stored in the identifier tables,
the database is stored in a storage,
the plurality of data identifiers is stored in each of the identifier tables sequentially,
the data processing is performed using the link table and the identifier tables,
the database includes a plurality of sub-entity data having content related to the plurality of entity data,
the identifier table further includes sub-data identifiers that are in one-to-one correspondence with the data identifiers and uniquely indicate the sub-entity data, and
when selecting entity data from the entity data group by searching the identifier table, the data processing unit reads sub-entity data having content related to the selected entity data from the database using the sub-data identifiers.

21. A non-transitory computer-readable storage medium storing a program for causing a computer to execute a database management process, the database management process comprising:
receiving a query for a database including an entity data group containing a plurality of entity data and a plurality of identifier tables having only a plurality of fixed-length data; and
performing data processing on the database on the basis of the received query,
wherein each of the identifier tables includes at least one tuple that is defined in a row direction and at least one attribute field that is defined in a column direction, stores a plurality of data identifiers uniquely indicating the plurality of entity data as the fixed-length data, and has data structure corresponding to the at least one attribute field into which a tabular data having a plurality of tuples including the plurality of data identifiers according to a plurality of attribute fields is divided,
the database further includes a link table that links corresponding tuples between the identifier tables, and includes at least one tuple including data to link between the plurality of data identifiers, which are stored in the identifier tables,
the plurality of data identifiers is stored in each of the identifier tables sequentially,
the data processing is performed using the link table and the identifier tables,
the database includes a plurality of sub-entity data having content related to the plurality of entity data,
the identifier table further includes sub-data identifiers that are in one-to-one correspondence with the data identifiers and uniquely indicate the sub-entity data, and
when selecting entity data from the entity data group by searching the identifier table, the data processing unit reads sub-entity data having content related to the selected entity data from the database using the sub-data identifiers.

* * * * *